United States Patent
Islam et al.

(10) Patent No.: US 10,785,080 B2
(45) Date of Patent: Sep. 22, 2020

(54) DETERMINING A NUMBER OF RACH PREAMBLE MESSAGES FOR TRANSMISSION

(71) Applicant: QUALCOMM Incorporated, San Diego, CA (US)

(72) Inventors: Muhammad Nazmul Islam, Littleton, MA (US); Bilal Sadiq, Basking Ridge, NJ (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/219,545

(22) Filed: Dec. 13, 2018

(65) Prior Publication Data
US 2019/0215220 A1    Jul. 11, 2019

Related U.S. Application Data

(60) Provisional application No. 62/616,355, filed on Jan. 11, 2018.

(51) Int. Cl.
*H04L 27/26* (2006.01)
*H04L 1/18* (2006.01)
(Continued)

(52) U.S. Cl.
CPC ....... *H04L 27/2692* (2013.01); *H04B 7/0695* (2013.01); *H04B 7/088* (2013.01);
(Continued)

(58) Field of Classification Search
CPC . H04L 27/2692; H04L 1/1832; H04L 1/0693; H04B 7/088; H04B 7/0695;
(Continued)

(56) References Cited

U.S. PATENT DOCUMENTS

| 10,531,508 B2 * | 1/2020 | Wu ........................ H04W 76/15 |
| 2014/0023030 A1 * | 1/2014 | Jeong .................... H04L 1/1851 |
| | | 370/329 |

(Continued)

FOREIGN PATENT DOCUMENTS

| EP | 3419340 A1 | 12/2018 |
| WO | WO-2017044155 A1 | 3/2017 |
| WO | WO-2017155239 A2 | 9/2017 |

OTHER PUBLICATIONS

Ericsson., "Handover Command and CSI-RS Configuration of Target", 3GPP Draft, R2-1704085—HO Execution Based on CSI-RS Measurement in NR, 3rd Generation Partnership Project (3GPP), Mobile Competence Centre, 650, Route Des Lucioles, F-06921 Sophia-Antipolis Cedex, vol. RAN WG2, No. Hangzhou, China, May 15, 2017-May 19, 2017 May 6, 2017 (May 6, 2017), pp. 1-3, XP051264263, Retrieved from the Internet: URL:http://www.3gpp.org/ftp/tsg_ran/WG2_RL2/TSGR2_98/Docs/ [retrieved on May 6, 2017].

(Continued)

*Primary Examiner* — Sharad Rampuria
(74) *Attorney, Agent, or Firm* — Holland & Hart LLP

(57) ABSTRACT

Methods, systems, and devices for wireless communications are described. In some systems, base stations and user equipment (UEs) may use beamforming for transmitting random access channel (RACH) messages. A UE may transmit multiple RACH preamble messages (e.g., within a random access response (RAR) window) to initiate a RACH procedure. The UE may transmit the RACH preamble messages in transmission opportunities corresponding to reference signals received from the base station. In some cases, the UE may determine the number of RACH preamble messages to transmit within the RAR window based on an ability of the UE to simultaneously monitor for a RAR message in response to each of the transmitted messages. In (Continued)

other cases, the UE may transmit an indication of UE capabilities to the base station. The base station may determine a RACH resource configuration for the UE based on the capabilities and may indicate the configuration to the UE.

98 Claims, 18 Drawing Sheets

(51) Int. Cl.
- H04L 1/06 (2006.01)
- H04W 74/08 (2009.01)
- H04W 72/04 (2009.01)
- H04B 7/08 (2006.01)
- H04B 7/06 (2006.01)

(52) U.S. Cl.
CPC .......... *H04L 1/0693* (2013.01); *H04L 1/1832* (2013.01); *H04W 72/048* (2013.01); *H04W 74/085* (2013.01)

(58) Field of Classification Search
CPC . H04B 7/2121; H04B 7/2123; H04W 74/085; H04W 72/048; H04W 72/04; H04W 72/12; H04W 76/00; H04J 2203/0069; H04Q 2213/394

See application file for complete search history.

(56) References Cited

U.S. PATENT DOCUMENTS

2017/0251460 A1   8/2017  Agiwal et al.
2018/0235013 A1*  8/2018  Jung ................. H04W 74/006

OTHER PUBLICATIONS

International Search Report and Written Opinion—PCT/US2018/065722—ISA/EPO—dated Mar. 1, 2019.
QUALCOMM Incorporated., "PRACH Procedure Considerations", 3GPP Draft, R1-1718532 PRACH Procedure Considerations, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017 Oct. 8, 2017 (Oct. 8, 2017), 13 Pages, XP051341714, Retrieved from the Internet: URL:http://www.3gpp.org/ftp/Meetings_3GPP_SYNC/RAN1/Docs/ [retrieved on Oct. 8, 2017].

* cited by examiner

DETERMINING A NUMBER OF RACH PREAMBLE MESSAGES FOR TRANSMISSION

CROSS REFERENCES

The present Application for Patent claims the benefit of U.S. Provisional Patent Application No. 62/616,355 by Islam et al., entitled "DETERMINING A NUMBER OF RACH PREAMBLE MESSAGES FOR TRANSMISSION," filed Jan. 11, 2018, assigned to the assignee hereof, and expressly incorporated herein.

BACKGROUND

The following relates generally to wireless communication, and more specifically to determining a number of random access channel (RACH) preamble messages for transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications between two wireless nodes (e.g., between a base station and a UE) may use beams or beam-formed signals for transmission and/or reception. A base station may transmit beam-formed synchronization signals on downlink synchronization beams. A UE may receive a synchronization signal on one or more of the downlink synchronization beams, and thus be enabled to initiate a RACH procedure with the base station. In some cases, the UE may send a message to the base station as part of the RACH procedure. The UE may send the message using an uplink transmit beam, and the base station may receive the transmission using an uplink receive beam. However, in some examples, the base station may send the UE multiple RACH transmission opportunities within a short time frame (e.g., within a few milliseconds). The UE may not be able to efficiently determine how many of the transmission opportunities to utilize for RACH messaging, as increasing the number of transmissions may incur a tradeoff between the likelihood of reception at the base station and the ability of the UE to receive further RACH messages from the base station in response.

SUMMARY

The described techniques relate to improved methods, systems, devices, or apparatus that support determining a number of random access channel (RACH) preamble messages for transmission. Generally, the described techniques provide for base station resource configurations or user equipment (UE) determination techniques to determine the number of RACH preamble messages for transmission. In some wireless communication systems, a UE may transmit multiple RACH preamble messages within a random access response (RAR) window to initiate a RACH procedure (e.g., a contention-free or contention-based random access procedure). The UE may transmit the RACH preamble messages in transmission opportunities corresponding to reference signals received from a base station. In some cases, the UE may determine the number of RACH preamble messages to transmit within the RAR window based on an ability of the UE to simultaneously monitor for a RAR message in response to each of the transmitted messages. For example, the UE may receive a set of reference signals (e.g., synchronization signal blocks (SSBs), channel state information reference signals (CSI-RSs), etc.) including RACH transmission opportunities, and may determine a number of RACH preamble messages to transmit in the transmission opportunities based on which and how many downlink receive beams the UE can monitor for responses. In other cases, the UE may transmit, to the base station, an indication of one or more capabilities of the UE. The base station may determine a RACH resource configuration for the UE based on these received capabilities and may transmit an indication of the resource configuration to the UE. The UE may determine the number of RACH preamble messages to transmit based at least in part on the received configuration.

A method of wireless communication at a UE is described. The method may include receiving a set of reference signals, where each reference signal of the set of reference signals corresponds to at least one transmission opportunity for a RACH preamble message transmission, and determining a number of RACH preamble messages to transmit in response to the received set of reference signals, where the determining is based at least in part on a capability of the UE to simultaneously monitor for RAR messages corresponding to the number of RACH preamble messages. The method may further include transmitting the determined number of RACH preamble messages based at least in part on the determining, where each RACH preamble message of the number of RACH preamble messages corresponds to a reference signal of the received set of reference signals.

An apparatus for wireless communication at a UE is described. The apparatus may include means for receiving a set of reference signals, where each reference signal of the set of reference signals corresponds to at least one transmission opportunity for a RACH preamble message transmission, and means for determining a number of RACH preamble messages to transmit in response to the received set of reference signals, where the determining is based at least in part on a capability of the UE to simultaneously monitor for RAR messages corresponding to the number of RACH preamble messages. The apparatus may further include means for transmitting the determined number of RACH preamble messages based at least in part on the determining, where each RACH preamble message of the number of RACH preamble messages corresponds to a reference signal of the received set of reference signals.

Another apparatus for wireless communication at a UE is described. The apparatus may include a processor, memory in electronic communication with the processor, and instructions stored in the memory. The instructions may be operable to cause the processor to receive a set of reference signals, where each reference signal of the set of reference signals corresponds to at least one transmission opportunity for a RACH preamble message transmission, and determine a number of RACH preamble messages to transmit in response to the received set of reference signals, where the determining is based at least in part on a capability of the UE to simultaneously monitor for RAR messages corresponding to the number of RACH preamble messages. The instructions may be further operable to cause the processor to transmit the determined number of RACH preamble messages based at least in part on the determining, where each RACH preamble message of the number of RACH preamble messages corresponds to a reference signal of the received set of reference signals.

A non-transitory computer-readable medium for wireless communication at a UE is described. The non-transitory computer-readable medium may include instructions operable to cause a processor to receive a set of reference signals, where each reference signal of the set of reference signals corresponds to at least one transmission opportunity for a RACH preamble message transmission, and determine a number of RACH preamble messages to transmit in response to the received set of reference signals, where the determining is based at least in part on a capability of the UE to simultaneously monitor for RAR messages corresponding to the number of RACH preamble messages. The instructions may be further operable to cause the processor to transmit the determined number of RACH preamble messages based at least in part on the determining, where each RACH preamble message of the number of RACH preamble messages corresponds to a reference signal of the received set of reference signals.

In some examples of the method, apparatus, and non-transitory computer-readable medium described above, transmitting the determined number of RACH preamble messages involves transmitting the determined number of RACH preamble messages in a RAR window. In some examples of the method, apparatus, and non-transitory computer-readable medium described above, transmitting the determined number of RACH preamble messages in the RAR window involves transmitting at least one RACH preamble message of the determined number of RACH preamble messages before expiration of the RAR window, where the RAR window corresponds to a previously transmitted RACH preamble message.

In some examples of the method, apparatus, and non-transitory computer-readable medium described above, transmitting the determined number of RACH preamble messages involves transmitting multiple RACH preamble messages corresponding to a same reference signal of the set of references signals within the RAR window based at least in part on the same reference signal corresponding to multiple transmission opportunities for RACH preamble message transmissions.

In some examples of the method, apparatus, and non-transitory computer-readable medium described above, the RAR window corresponds to a first RACH preamble message of the number of RACH preamble messages.

Some examples of the method, apparatus, and non-transitory computer-readable medium described above may further include processes, features, means, or instructions for monitoring for a set of RAR messages, where each RAR message of the set of RAR messages may be in response to an associated RACH preamble message of the number of RACH preamble messages. In some examples of the method, apparatus, and non-transitory computer-readable medium described above, each reference signal of the set of reference signals may be received on a particular receive beam, and where monitoring for the set of RAR messages involves monitoring for each RAR message on the particular receive beam for the reference signal corresponding to the associated RACH preamble message.

Some examples of the method, apparatus, and non-transitory computer-readable medium described above may further include processes, features, means, or instructions for receiving one or more RAR messages in response to one or more of the number of RACH preamble messages. Some examples of the method, apparatus, and non-transitory computer-readable medium described above may further include processes, features, means, or instructions for halting the monitoring based at least in part on receiving a first RAR message in response to the one or more of the number of RACH preamble messages.

Some examples of the method, apparatus, and non-transitory computer-readable medium described above may further include processes, features, means, or instructions for selecting one RAR message from multiple received RAR messages based at least in part on a receiving order of the multiple received RAR messages, indicated RACH message 3 (Msg3) transmission powers for the multiple received RAR messages, estimated receive powers for the multiple received RAR messages, a pseudo-random selection process, or a combination thereof. Some examples of the method, apparatus, and non-transitory computer-readable medium described above may further include processes, features, means, or instructions for transmitting a single RACH Msg3 in response to the multiple received RAR messages based at least in part on the selecting. Some examples of the method, apparatus, and non-transitory computer-readable medium described above may further include processes, features, means, or instructions for transmitting multiple RACH Msg3 transmissions in response to multiple received RAR messages.

In some examples of the method, apparatus, and non-transitory computer-readable medium described above, the capability of the UE to monitor for RAR messages for each of the corresponding RACH preamble messages may be based at least in part on a number of sub-arrays, a number of receive panels, a number of UE diversity branches, a number of reference signals received on each receive beam, or a combination thereof.

In some examples of the method, apparatus, and non-transitory computer-readable medium described above, determining the number of RACH preamble messages to transmit may be further based at least in part on whether each reference signal of the set of reference signals may be received at a reference signal receive power greater than a reference signal receive power threshold. In some examples of the method, apparatus, and non-transitory computer-readable medium described above, each reference signal of the set of reference signals may be simultaneously received at the reference signal receive power greater than the reference signal receive power threshold. In some examples of the method, apparatus, and non-transitory computer-readable medium described above, each reference signal of the set of reference signals may be received with a same beam at the reference signal receive power greater than the reference signal receive power threshold. Some examples of the method, apparatus, and non-transitory computer-readable medium described above may further include processes, features, means, or instructions for determining the reference signal receive power threshold based at least in part on a network configuration.

In some examples of the method, apparatus, and non-transitory computer-readable medium described above, the set of reference signals includes SSBs, CSI-RSs, or a combination thereof.

In some examples of the method, apparatus, and non-transitory computer-readable medium described above, at least one of the number of RACH preamble messages corresponds to a contention-free RACH procedure. Some examples of the method, apparatus, and non-transitory computer-readable medium described above may further include processes, features, means, or instructions for receiving a single RAR message in response to multiple RACH preamble messages.

In some examples of the method, apparatus, and non-transitory computer-readable medium described above, at least one of the number of RACH preamble messages corresponds to a contention-based RACH procedure. In some examples of the method, apparatus, and non-transitory computer-readable medium described above, determining the number of RACH preamble messages to transmit may be further based at least in part on a maximum number of RACH preamble messages to transmit within a RAR window.

A method of wireless communication at a base station is described. The method may include transmitting a set of reference signals, where each reference signal of the set of reference signals corresponds to at least one transmission opportunity for a RACH preamble message transmission, and receiving, from a UE, a number of RACH preamble messages based at least in part on a capability of the UE to simultaneously monitor for RAR messages in response to the number of RACH preamble messages, where each RACH preamble message of the number of RACH preamble messages corresponds to a reference signal of the set of reference signals. The method may further include transmitting at least one RAR message in response to the number of RACH preamble messages.

An apparatus for wireless communication at a base station is described. The apparatus may include means for transmitting a set of reference signals, where each reference signal of the set of reference signals corresponds to at least one transmission opportunity for a RACH preamble message transmission, and means for receiving, from a UE, a number of RACH preamble messages based at least in part on a capability of the UE to simultaneously monitor for RAR messages in response to the number of RACH preamble messages, where each RACH preamble message of the number of RACH preamble messages corresponds to a reference signal of the set of reference signals. The apparatus may further include means for transmitting at least one RAR message in response to the number of RACH preamble messages.

Another apparatus for wireless communication at a base station is described. The apparatus may include a processor, memory in electronic communication with the processor, and instructions stored in the memory. The instructions may be operable to cause the processor to transmit a set of reference signals, where each reference signal of the set of reference signals corresponds to at least one transmission opportunity for a RACH preamble message transmission, and receive, from a UE, a number of RACH preamble messages based at least in part on a capability of the UE to simultaneously monitor for RAR messages in response to the number of RACH preamble messages, where each RACH preamble message of the number of RACH preamble messages corresponds to a reference signal of the set of reference signals. The instructions may be further operable to cause the processor to transmit at least one RAR message in response to the number of RACH preamble messages.

A non-transitory computer-readable medium for wireless communication at a base station is described. The non-transitory computer-readable medium may include instructions operable to cause a processor to transmit a set of reference signals, where each reference signal of the set of reference signals corresponds to at least one transmission opportunity for a RACH preamble message transmission, and receive, from a UE, a number of RACH preamble messages based at least in part on a capability of the UE to simultaneously monitor for RAR messages in response to the number of RACH preamble messages, where each RACH preamble message of the number of RACH preamble messages corresponds to a reference signal of the set of reference signals. The instructions may be further operable to cause the processor to transmit at least one RAR message in response to the number of RACH preamble messages.

In some examples of the method, apparatus, and non-transitory computer-readable medium described above, receiving, from the UE, the number of RACH preamble messages involves receiving, from the UE, the number of RACH preamble messages in a RAR window. In some examples of the method, apparatus, and non-transitory computer-readable medium described above, receiving, from the UE, the number of RACH preamble messages in the RAR window involves receiving at least one RACH preamble message of the number of RACH preamble messages before expiration of the RAR window, where the RAR window corresponds to a previously received RACH preamble message. In some examples of the method, apparatus, and non-transitory computer-readable medium described above, the at least one RAR message may be transmitted in the RAR window.

In some examples of the method, apparatus, and non-transitory computer-readable medium described above, transmitting the at least one RAR message involves transmitting a single RAR message in response to the number of RACH preamble messages. In other examples of the method, apparatus, and non-transitory computer-readable medium described above, transmitting the at least one RAR message involves transmitting a RAR message in response to each received RACH preamble message of the number of RACH preamble messages.

Some examples of the method, apparatus, and non-transitory computer-readable medium described above may further include processes, features, means, or instructions for receiving one or more RACH Msg3 transmissions in response to the at least one RAR message.

An additional method of wireless communication at a UE is described. The method may include transmitting an indication of one or more capabilities of the UE, receiving an indication of configured resources for multiple RACH preamble message transmissions based at least in part on the one or more capabilities of the UE, and transmitting a number of RACH preamble messages according to the configured resources.

An apparatus for wireless communication at a UE is described. The apparatus may include means for transmitting an indication of one or more capabilities of the UE, means for receiving an indication of configured resources for multiple RACH preamble message transmissions based at least in part on the one or more capabilities of the UE, and means for transmitting a number of RACH preamble messages according to the configured resources.

Another apparatus for wireless communication at a UE is described. The apparatus may include a processor, memory in electronic communication with the processor, and instructions stored in the memory. The instructions may be operable to cause the processor to transmit an indication of one or more capabilities of the UE, receive an indication of configured resources for multiple RACH preamble message transmissions based at least in part on the one or more capabilities of the UE, and transmit a number of RACH preamble messages according to the configured resources.

A non-transitory computer-readable medium for wireless communication at a UE is described. The non-transitory computer-readable medium may include instructions operable to cause a processor to transmit an indication of one or more capabilities of the UE, receive an indication of configured resources for multiple RACH preamble message transmissions based at least in part on the one or more capabilities of the UE, and transmit a number of RACH preamble messages according to the configured resources.

In some examples of the method, apparatus, and non-transitory computer-readable medium described above, receiving the indication of the configured resources for multiple RACH preamble message transmissions further involves receiving the indication of the configured resources for multiple RACH preamble message transmissions within a RAR window.

In some examples of the method, apparatus, and non-transitory computer-readable medium described above, the one or more capabilities include a maximum number of reference signals that the UE can detect from one or more base stations simultaneously. In some examples of the method, apparatus, and non-transitory computer-readable medium described above, the UE can simultaneously detect the maximum number of reference signals with reference signal receive powers greater than a reference signal receive power threshold. In some examples of the method, apparatus, and non-transitory computer-readable medium described above, the reference signals include SSBs, CSI-RSs, or a combination thereof.

In some examples of the method, apparatus, and non-transitory computer-readable medium described above, the one or more capabilities include a number of sub-arrays, a number of receive panels, a number of UE diversity branches, a number of receive beams, a number of transmit beams, or a combination thereof.

In some examples of the method, apparatus, and non-transitory computer-readable medium described above, the one or more capabilities include a level of beam correspondence for the UE. Some examples of the method, apparatus, and non-transitory computer-readable medium described above may further include processes, features, means, or instructions for receiving a set of reference signals, where a number of transmission opportunities for RACH preamble message transmissions for each reference signal of the set of reference signals may be based at least in part on a number of transmit beams for the UE to use for each receive beam.

In some examples of the method, apparatus, and non-transitory computer-readable medium described above, the indication of the configured resources includes a handover message, radio resource control (RRC) signaling, a medium access control (MAC) control element (CE), downlink control information (DCI), a master information block (MIB), remaining system information (RMSI), other system information (OSI), or a combination thereof.

In some examples of the method, apparatus, and non-transitory computer-readable medium described above, the configured resources correspond to a contention-free RACH procedure.

An additional method of wireless communication at a base station is described. The method may include receiving an indication of one or more capabilities of a UE, configuring resources for multiple RACH preamble message transmissions based at least in part on the one or more capabilities of the UE, and transmitting, to the UE, an indication of the configured resources.

An apparatus for wireless communication at a base station is described. The apparatus may include means for receiving an indication of one or more capabilities of a UE, means for configuring resources for multiple RACH preamble message transmissions based at least in part on the one or more capabilities of the UE, and means for transmitting, to the UE, an indication of the configured resources.

Another apparatus for wireless communication at a base station is described. The apparatus may include a processor, memory in electronic communication with the processor, and instructions stored in the memory. The instructions may be operable to cause the processor to receive an indication of one or more capabilities of a UE, configure resources for multiple RACH preamble message transmissions based at least in part on the one or more capabilities of the UE, and transmit, to the UE, an indication of the configured resources.

A non-transitory computer-readable medium for wireless communication at a base station is described. The non-transitory computer-readable medium may include instructions operable to cause a processor to receive an indication of one or more capabilities of a UE, configure resources for multiple RACH preamble message transmissions based at least in part on the one or more capabilities of the UE, and transmit, to the UE, an indication of the configured resources.

In some examples of the method, apparatus, and non-transitory computer-readable medium described above, configuring the resources for multiple RACH preamble transmissions further involves configuring the resources for multiple RACH preamble message transmissions within a RAR window.

In some examples of the method, apparatus, and non-transitory computer-readable medium described above, the one or more capabilities include a maximum number of reference signals that the UE can detect from one or more base stations within a time window. In some examples of the method, apparatus, and non-transitory computer-readable medium described above, the maximum number of reference signals may be based at least in part on a reference signal receive power threshold. In some examples of the method, apparatus, and non-transitory computer-readable medium described above, the reference signals include SSBs, CSI-RSs, or a combination thereof.

In some examples of the method, apparatus, and non-transitory computer-readable medium described above, the one or more capabilities include a number of sub-arrays, a number of receive panels, a number of UE diversity branches, a number of receive beams, a number of transmit beams, or a combination thereof.

In some examples of the method, apparatus, and non-transitory computer-readable medium described above, the one or more capabilities include a level of beam correspondence for the UE. Some examples of the method, apparatus, and non-transitory computer-readable medium described above may further include processes, features, means, or instructions for transmitting a set of reference signals, where a number of transmission opportunities for RACH preamble message transmissions for each reference signal of the set of reference signals may be based at least in part on a number of transmit beams for the UE to use for each receive beam.

In some examples of the method, apparatus, and non-transitory computer-readable medium described above, the indication of the configured resources includes a handover message, RRC signaling, a MAC CE, DCI, an MIB, RMSI, OSI, or a combination thereof.

Some examples of the method, apparatus, and non-transitory computer-readable medium described above may further include processes, features, means, or instructions for receiving a number of RACH preamble messages according to the configured resources. In some examples of the method, apparatus, and non-transitory computer-readable medium described above, the configured resources correspond to a contention-free RACH procedure.

DETAILED DESCRIPTION

Figure 1:
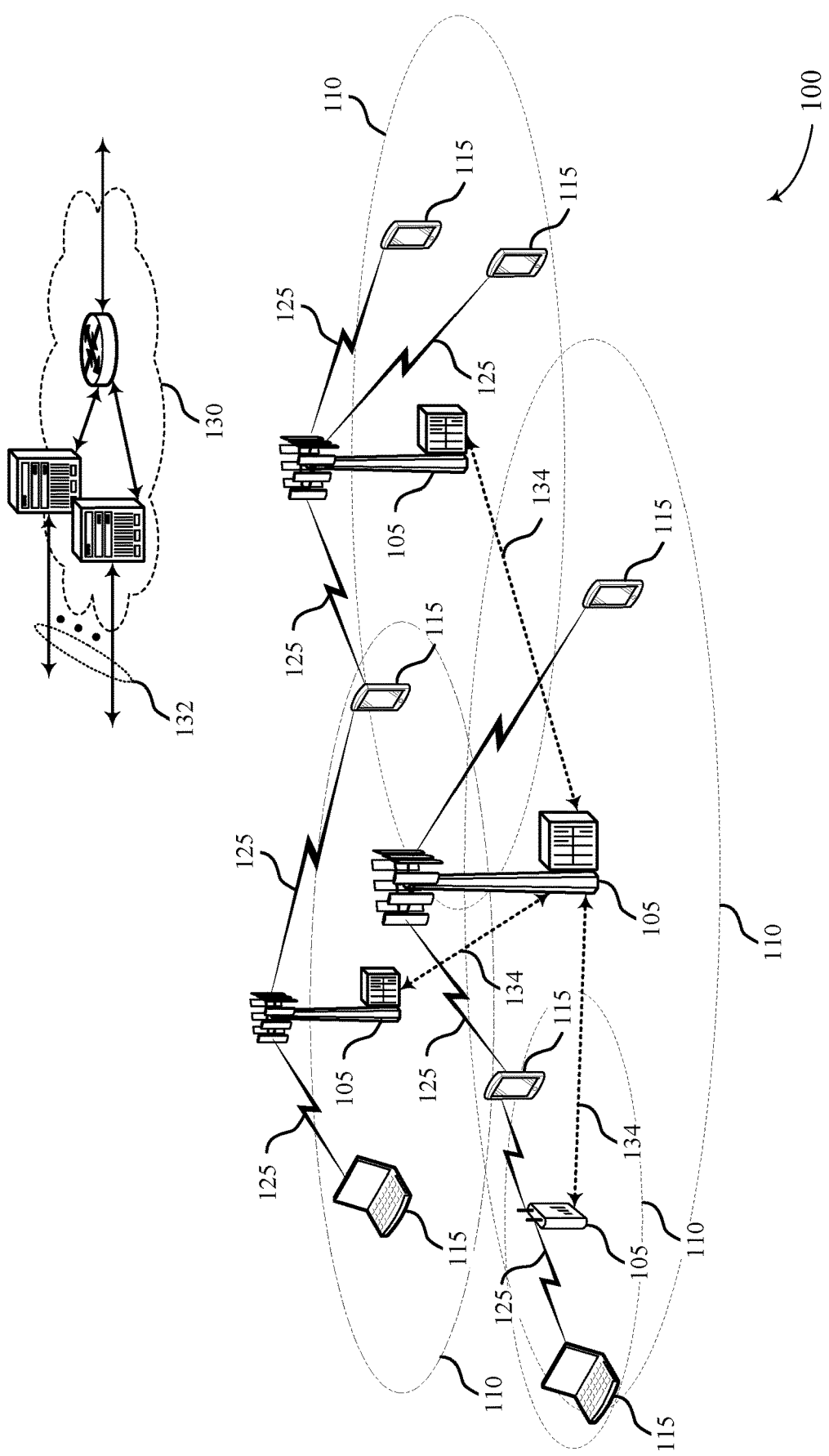
FIG. 1 illustrates an example of a system for wireless communication that supports determining a number of random access channel (RACH) preamble messages for transmission in accordance with aspects of the present disclosure.

In some wireless communications systems, base stations and user equipment (UEs) may communicate using beamformed transmissions. For example, a base station may transmit signals to a UE using a downlink transmit beam, and the UE may receive the signals using a downlink receive beam. Similarly, the UE may transmit to the base station using uplink transmit beams, which may or may not correspond to the downlink receive beams. In some cases, a UE may utilize these uplink transmit beams for synchronization message transmissions in order to synchronize with a network or cell (e.g., associated with a base station). This synchronization procedure may be referred to as a random access or random access channel (RACH) procedure. The UE may transmit one or more RACH preamble messages to the base station using the uplink transmit beams in order to initiate the RACH procedure.

The UE may determine RACH preamble message transmission resources based on signaling from the base station. For example, the base station may transmit one or more reference signals to the UE, where each reference signal includes indications of one or more RACH transmission opportunities. The UE may receive these reference signals on downlink receive beams and may determine the number of RACH preamble messages to transmit (e.g., using the indicated resources of the transmission opportunities) based on a capability of the UE to monitor for random access responses (RARs). For example, for each RACH preamble message transmitted to the base station, the UE may monitor for a RAR message in response. Receiving a RAR message from the base station may allow the UE to continue the RACH procedure. If the UE transmits multiple RACH preamble messages without waiting for a response for each one (e.g., if the RACH preamble messages are transmitted within a same RAR window), the UE may need to simultaneously monitor for multiple RAR messages in response. In order to support this RAR monitoring, the UE 115 may determine the number of RACH preamble messages to transmit based on the capability of the UE to monitor or receive the corresponding RAR messages. In some cases, when the RAR messages may be received on the same downlink receive beams as the corresponding reference signals, the UE may correspondingly base the number of RACH preamble messages on an ability to detect or receive the reference signals during a same time period or instant in time.

Additionally or alternatively, determining the number of RACH preamble messages for transmission may be based on a resource configuration. For example, the UE may indicate one or more UE capabilities of the UE to the base station. These capabilities may include a maximum number of reference signals that the UE can simultaneously detect or receive, a number of sub-arrays, a number of receive panels, a number of UE diversity branches, a number of receive or transmit beams, a level of beam correspondence, or any combination of these parameters. The base station may receive the UE capabilities, and may configure resources for RACH preamble message transmissions by the UE based on the received capabilities. For example, the base station may configure a number of reference signals to transmit, or a number of transmission opportunities associated with each reference signal. The base station may transmit an indication of the configured resources to the UE, and the UE may transmit a number of RACH preamble messages based on this RACH resource configuration.

Aspects of the disclosure are initially described in the context of wireless communications systems. Additional aspects of the disclosure are described with reference to a RACH messaging configuration and process flows. Aspects of the disclosure are further illustrated by and described with reference to apparatus diagrams, system diagrams, and flowcharts that relate to determining a number of RACH preamble messages for transmission.

FIG. 1 illustrates an example of a wireless communications system 100 that supports determining a number of RACH preamble messages for transmission in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Terrestrial Radio Access Network (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers (CCs), which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems, base stations 105 and UEs 115 may communicate using beam-formed transmissions. For example, a base station 105 may transmit signals to a UE 115 using a downlink transmit beam, and the UE 115 may receive the signals using a downlink receive beam. Similarly, the UE 115 may transmit to the base station 105 using uplink transmit beams, which may or may not correspond to the downlink receive beams. In some cases, the UE 115 may utilize these uplink transmit beams to transmit synchronization messages in order to synchronize with a network or cell (e.g., associated with the base station 105). This synchronization procedure may be referred to as a random access or RACH procedure. The UE 115 may transmit one or more RACH preamble messages to the base station 105 using the uplink transmit beams in order to initiate the RACH procedure.

The UE 115 may determine the resources for transmitting the RACH preamble messages based on signaling from the base station 105. For example, the base station 105 may transmit one or more reference signals to the UE 115, where each reference signal includes indications of one or more RACH transmission opportunities. The UE 115 may receive these reference signals on downlink receive beams and may determine the number of RACH preamble messages to transmit (e.g., using the indicated resources of the transmission opportunities) based on a capability of the UE 115 to monitor for responses. For example, for each RACH preamble message transmitted to the base station 105, the UE 115 may monitor for a RAR message in return. Receiving a RAR message from the base station 105 may continue the RACH process in order for the UE 115 to synchronize with the network or cell. If the UE 115 transmits multiple RACH preamble messages without waiting for a response for each one (e.g., if the RACH preamble messages are transmitted within a same RAR window), the UE 115 may need to monitor for multiple RAR messages in response during a same time period. For example, if the UE 115 transmits three RACH preamble messages during a RAR window, the UE 115 may monitor for three RAR messages in response during a same window or instant in time. In order to support this RAR monitoring, the UE 115 may determine the number of RACH preamble messages to transmit based on the capability of the UE 115 to monitor or receive the corresponding RAR messages. In some cases, as the RAR messages may be received on the same downlink receive beams as the corresponding reference signals, the UE 115 may correspondingly base the number of RACH preamble messages on an ability to simultaneously detect or receive the reference signals (e.g., at a receive power greater than a certain threshold).

Additionally or alternatively, determining the number of RACH preamble messages for transmission may be based on a resource configuration. For example, the UE 115 may indicate one or more UE capabilities of the UE 115 to the base station 105. These capabilities may include a maximum number of reference signals that the UE 115 can simultaneously detect or receive, a number of sub-arrays, a number of receive panels, a number of UE diversity branches, a number of receive or transmit beams, a level of beam correspondence, or any combination of these parameters. The base station 105 may receive the UE capabilities, and may configure RACH resources for the UE 115 based on the capabilities. For example, the base station 105 may configure a number of reference signals to transmit, or a number of transmission opportunities for each reference signal. The base station 105 may transmit an indication of the configured resources to the UE 115, and the UE 115 may transmit RACH preamble messages based on this received RACH resource configuration.

Figure 2:
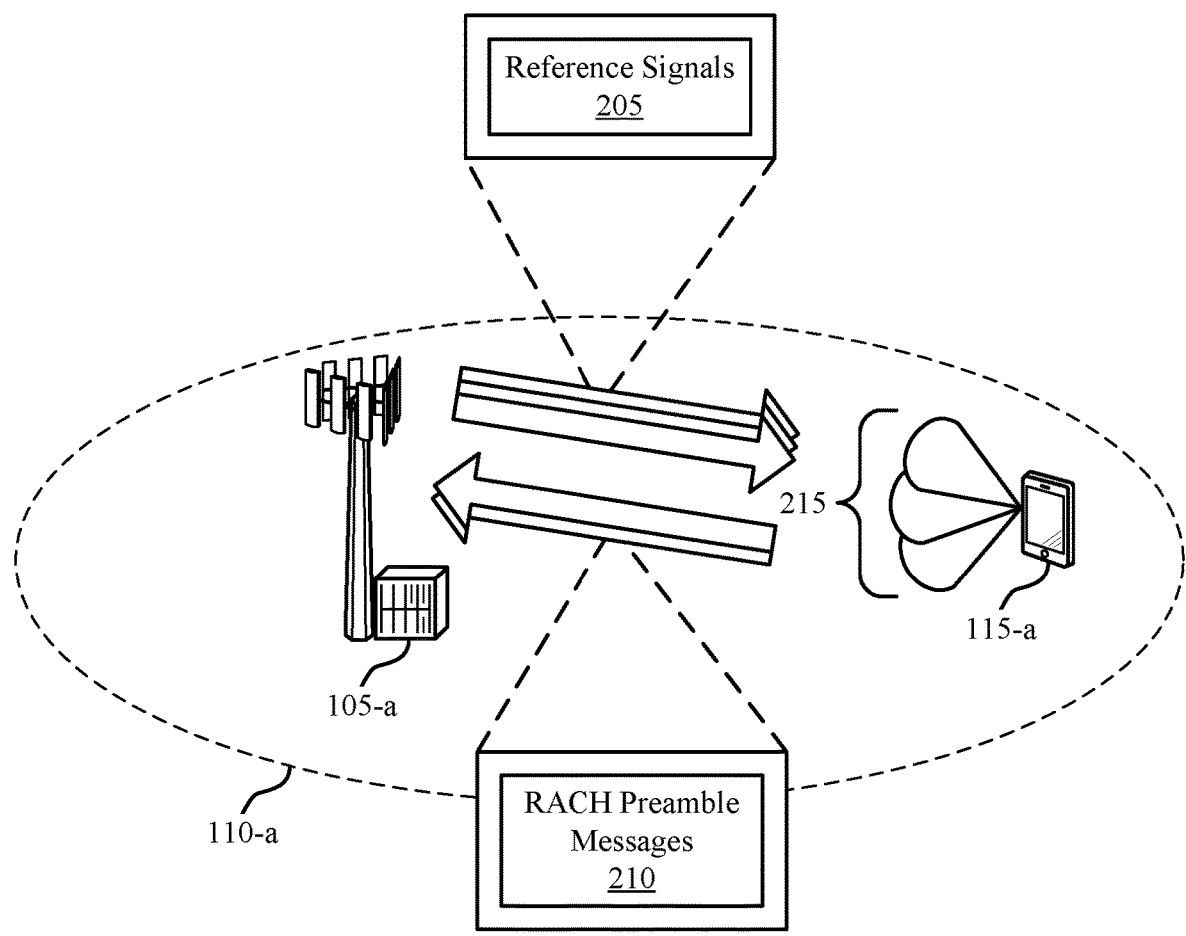
FIGS. 2 and 3 illustrate examples of wireless communication systems that support determining a number of RACH preamble messages for transmission in accordance with aspects of the present disclosure.

FIG. 2 illustrates an example of a wireless communication system 200 that supports determining a number of RACH preamble messages for transmission in accordance with aspects of the present disclosure. The wireless communication system 200 may include base station 105-a and UE 115-a, which may be examples of a base station 105 and a UE 115 as described with reference to FIG. 1. Base station 105-a may provide network coverage for geographic area 110-a. Base station 105-a and UE 115-a may communicate using beam-formed or directional transmissions. For example, UE 115-a may send uplink transmissions to base station 105-a using one or more of beams 215 (e.g., uplink transmit beams), and may receive transmissions from base station 105-a using one or more of beams 215 (e.g., downlink receive beams). Similarly, base station 105-a may transmit using downlink transmit beams and may receive using uplink receive beams (not shown). The wireless communication system 200 may support UE 115-a receiving multiple reference signals 205, and transmitting multiple RACH preamble messages 210 based on these reference signals and capabilities of the UE 115-a.

In some wireless systems (e.g., NR systems), a UE 115, such as UE 115-a, may transmit messages in order to synchronize with a network or a cell. For example, UE 115-a may transmit a RACH preamble message, which may be referred to or an example of a Message 1 (Msg1) transmission, a RACH message, or a RACH request, to base station 105-a to connect to the network or target cell. This transmission of the RACH preamble message may initialize a RACH procedure between UE 115-a and base station 105-a. In some cases, UE 115-a may transmit the RACH preamble message to gain initial access to the wireless network (e.g., from an RRC idle state), to re-establish connection to the network, during a handover procedure, when uplink synchronization is lost, or in any other scenario where the UE 115 may synchronize with the base station 105. UE 115-a may transmit the RACH preamble message based on one or more RACH parameters received from base station 105-a.

In some cases (e.g., before or during a handover process), base station 105-a may transmit a handover command to UE 115-a. For example, base station 105-a may be an example of a serving cell and may transmit the handover command associated with a target cell to hand UE 115-a over to. In some examples, base station 105-a or another such serving cell may send the handover command to UE 115-a via a relay device. The handover command may indicate the RACH resources for RACH message transmissions. The handover command may additionally include an indication of an association between RACH resources and channel state information reference signals (CSI-RS), which may be configured specifically for each UE 115. Additionally or alternatively, base station 105-a may transmit an indication of an association between RACH resources and synchronization signal blocks (SSBs), a set of dedicated RACH resources (e.g., time, frequency, or sequence), or other parameters for UE 115 synchronization.

UE 115-a may transmit the RACH preamble message with or without beam correspondence. A UE 115 with beam correspondence may map one or more uplink transmit beams 215 to one or more downlink receive beams 215. UE 115-*a* or base station 105-*a* may select these beams based on a signal strength, a channel quality, or some other transmission or reception parameter.

In some cases, UE 115-*a* may transmit multiple RACH preamble messages 210 within a RAR window, which may span a length of time based on a TTI of the UE 115 or base station 105 (e.g., 5 ms, 10 ms, etc.). If UE 115-*a* has no beam correspondence, the multiple RACH preamble messages 210 may support UE 115-*a* performing an uplink transmission beam sweep. Based on the uplink transmission beam sweep, UE 115-*a* may obtain beam correspondence by mapping one or more uplink transmit beams to downlink receive beams. If UE 115-*a* already has beam correspondence, UE 115-*a* may obtain beam diversity based on transmitting the multiple RACH preamble messages 210 (e.g., if a beam corresponding to one of the multiple RACH preamble messages 210 experiences interference, base station 105-*a* may still receive the RACH preamble message on another beam).

In some wireless communications systems, base station 105-*a* may transmit a set of reference signals 205 to UE 115-*a*. For example, base station 105-*a* may transmit, from one or more downlink transmit antennas or beams, one or more SSBs, CSI-RSs, or a combination of these or other reference signals 205 associated with RACH occasions (e.g., transmission opportunities). Each of these reference signals 205 may indicate resources for RACH preamble transmissions. For example, each reference signal may include at least one transmission opportunity for a RACH preamble message transmission by UE 115-*a*. Additionally or alternatively, each reference signal may allocate a pool of common RACH resources for any UEs 115 or dedicated RACH resources for a specific UE 115 to use for RACH preamble transmissions. The allocated RACH resources may be examples of time domain RACH resources, frequency domain RACH resources, or preamble sequence domain RACH resources.

In some RACH procedures (e.g., contention-free random access), UE 115-*a* may determine the number of RACH preamble messages 210 to transmit based on the received reference signals 205. For example, UE 115-*a* may determine the number of RACH preamble messages 210 to transmit in response to the reference signals 205 based on the capability of UE 115-*a* to monitor for corresponding RAR messages, which may be referred to as RACH Message 2 (Msg2) transmissions. For each RACH preamble message transmitted to base station 105-*a*, UE 115-*a* may monitor the channel for a RAR message sent in response during a RAR window. The RAR window for a RACH preamble message may begin upon transmitting the RACH preamble message, or after a static or dynamic-length buffer or offset period following the RACH preamble message transmission. In some cases, UE 115-*a* may transmit multiple RACH preamble messages 210 during a same RAR window. For example, UE 115-*a* may transmit a first RACH preamble message 210 and may monitor for a RAR message in a RAR window corresponding to this first RACH preamble message 210. UE 115-*a* may additionally transmit a second RACH preamble message 210 before expiration of this RAR window (e.g., the RAR window corresponding to a previously transmitted RACH preamble message 210). If UE 115-*a* transmits multiple RACH preamble messages 210 during a same RAR window before receiving RARs in response, UE 115-*a* may simultaneously (e.g., at a same moment in time, or during a same time window) monitor for responses to each of the pending RACH preamble messages 210.

UE 115-*a* may monitor for a RAR message from base station 105-*a* on the same beam 215 as the corresponding reference signal. For example, UE 115-*a* may receive reference signals 205 on one or more downlink receive beams. If UE 115-*a* transmits a RACH preamble message based on a reference signal (e.g., in a transmission opportunity of that reference signal), UE 115-*a* may monitor the same downlink receive beam that the reference signal was received on for a RAR message from base station 105-*a* in response to the RACH preamble message. In some cases, UE 115-*a* may transmit multiple RACH preamble messages 210 in multiple transmission opportunities for a single reference signal (e.g., using different uplink transmit beams 215 in cases without beam correspondence, and using a same uplink transmit beam in cases with beam correspondence), but may monitor the same downlink receive beam for any of the corresponding multiple RAR messages. To be able to monitor for all pending RAR responses, UE 115-*a* may transmit RACH preamble messages 210 in resources within a RAR window that correspond to reference signals 205 that UE 115-*a* may monitor or detect simultaneously.

Accordingly, UE 115-*a* may select the number of RACH preamble messages 210 to transmit—or, similarly, determine a maximum number of RACH preamble messages 210 to transmit within a RAR window-based on a number of reference signals 205 that UE 115-*a* may monitor for simultaneously, or correspondingly based on a number of RARs that UE 115-*a* may receive or detect simultaneously. If UE 115-*a* determines the maximum number of RACH preamble messages 205, UE 115-*a* may select any number of RACH preamble messages 210 to transmit up to and including the determined maximum (e.g., selecting specific transmission opportunities or resources for transmission in a pseudo-random manner, according to an order of receiving or decoding the reference signals 205, or according to receive or transmit powers). The number of RACH preamble transmissions may be based on the number of downlink receive beams utilized by UE 115-*a*, the number of antenna diversity branches for UE 115-*a*, the number of sub-arrays or receive panels at UE 115-*a*, the number of reference signals 205 UE 115-*a* may detect with different receive panels, which downlink receive beams UE 115-*a* receives the reference signals 205 on, or a combination of these parameters.

For example, when monitoring the channel, UE 115-*a* may monitor for any RAR message, as opposed to a specific RAR message. If UE 115-*a* receives multiple reference signals 205 over one downlink receive beam, UE 115-*a* may use a single diversity branch to monitor this downlink receive beam for RARs in response to RACH preamble messages 210 for any of these multiple reference signals 205. Accordingly, in one example, UE 115-*a* may include two diversity branches. If UE 115-*a* receives a first reference signal (e.g., an SSB or a CSI-RS) over a first downlink receive beam, second and third reference signals over a second downlink receive beam, and a fourth reference signal over a third downlink receive beam, UE 115-*a* may transmit three RACH preamble messages 210 corresponding to the second reference signal, the third reference signal, and either the first or the fourth reference signal (e.g., based on a receive signal strength of the first and fourth reference signals). Within a RAR window (e.g., the RAR window triggered by the first RACH preamble messages transmission), UE 115-*a* may monitor the second downlink receive beam for RAR messages corresponding to the second and third reference signals using one diversity branch, while simultaneously monitoring the first or third downlink receive beam for a RAR message corresponding to the first or the fourth reference signal using the second diversity branch. In some cases, UE 115-*a* may transmit more RACH preamble messages 210 in such an example, if UE 115-*a* transmits multiple RACH preamble messages 210 based on a same reference signal (e.g., transmitting RACH preamble messages 210 in multiple transmission opportunities indicated by a single reference signal).

In some cases, receiving the reference signals 205 or RAR messages may be based on a threshold. For example, UE 115-*a* may determine reference signals 205 received with a reference signal receive power greater than a reference signal receive power threshold. UE 115-*a* may identify the reference signals 205 received simultaneously above the threshold for a set of downlink receive beams 215 (e.g., where the set of downlink receive beams 215 are generated from different sub-arrays). In some cases, UE 115-*a* may transmit RACH preamble messages 210 corresponding to reference signals 205 (e.g., all or a subset of the reference signals) received above the threshold and may not transmit RACH preamble messages 210 corresponding to any reference signals 205 received below the threshold. In other cases, UE 115-*a* may transmit RACH preamble messages 210 corresponding to each reference signal above the threshold (e.g., either in every transmission opportunity, or in at least one transmission opportunity for each reference signal), before transmitting any RACH preamble messages 210 corresponding to any reference signals below the threshold. In yet other cases, UE 115-*a* may transmit one RACH preamble message corresponding to a reference signal above the threshold, and then may select to transmit RACH preamble messages 210 corresponding to reference signals 205 received above or below the threshold. In some examples, UE 115-*a* may determine the reference signal receive power threshold based on information or a table stored in memory of the device. In other examples, UE 115-*a* may receive a configuration from the network—either via base station 105-*a* or another base station 105—and may determine the reference signal receive power threshold based on the network configuration.

If base station 105-*a* receives one or more of the RACH preamble messages 210, base station 105-*a* may transmit a RAR message on the downlink in response. For example, base station 105-*a* may determine the resources used by UE 115-*a* for a RACH preamble message and may identify the corresponding reference signal based on the resources (e.g., in some cases, based on an SSB index). Base station 105-*a* may transmit the RAR message using the same downlink transmit antenna used for the corresponding reference signal. As base station 105-*a* transmits using the same downlink transmit beam, UE 115-*a* may receive using the same downlink receive beam (e.g., based on beam correspondence, or based on signal strengths of transmissions between these beams). Base station 105-*a* may dynamically select transmit strengths for RAR messages based on an estimated receive power or reception reliability for UE 115-*a*.

Base station 105-*a* may receive multiple RACH preamble messages 210 from UE 115-*a* (e.g., base station 105-*a* may receive a first RACH preamble message 210 and may additionally receive a second RACH preamble message 210 prior to expiration of the RAR window for the first RACH preamble message 210). In some cases, base station 105-*a* may identify that the multiple RACH preamble messages 210 correspond to the same UE 115 (e.g., in a contention-free random access procedure) and may transmit a single RAR message in response to all of the multiple RACH preamble messages 210. In these cases, base station 105-*a* may select the RACH preamble message to respond to (e.g., base station 105-*a* may use the downlink antenna or transmit beam for the corresponding reference signal) based on a random or pseudo-random selection process, based on the first RACH preamble message decoded or received, based on an indicated or estimated transmission or receive power (e.g., according to a lowest indicated transmit power or a highest estimated receive power), or based on some combination of these techniques. In other cases, despite identifying that the RACH preamble messages 210 correspond to a same UE 115, base station 105-*a* may transmit RAR messages in response to multiple RACH preamble messages 210 (e.g., all or a subset of the messages) to improve reliability. In these cases, base station 105-*a* may select RAR messages to transmit such that the RAR transmissions are non-overlapping. In yet other cases, base station 105-*a* may not identify that the different RACH preamble messages 210 are associated with a same UE 115 (e.g., in contention-based random access), and may transmit a RAR message in response to each received RACH preamble message 210.

In some RACH procedures (e.g., contention-based random access procedures), UE 115-*a* may receive one or more of the RAR messages in response to the RACH preamble messages 210 (e.g., in the corresponding RAR windows), and may similarly determine to transmit one or more RACH Message 3 (Msg3) transmissions in response to continue the RACH procedure. For example, if UE 115-*a* receives multiple RAR messages from base station 105-*a*, UE 115-*a* may select to transmit one RACH Msg3 (e.g., in response to a random RAR message, the first received or decoded RAR message, or based on a transmit power indicated in the RAR configuration or an estimated receive power) or multiple RACH Msg3s (e.g., selecting multiple RAR messages to respond to such that the resources for the corresponding RACH Msg3 transmissions do not overlap).

In some configurations, UE 115-*a* may receive a RAR message from base station 105-*a* in response to the RACH preamble messages 210 and may stop monitoring for any other RAR messages in pending RAR windows. In these configurations, UE 115-*a* may transmit one RACH Msg3 in response to the received RAR message. In other configurations, UE 115-*a* may receive the RAR message and may stop monitoring for RAR messages in the corresponding RAR window but may continue to monitor for any other RAR messages still pending in other RAR windows. For example, if UE 115-*a* transmits two RACH preamble messages 210, UE 115-*a* may receive a first RAR message in a first RAR window but may continue to monitor the second RAR window for a second RAR message. If UE 115-*a* additionally receives the second RAR message, UE 115-*a* may determine whether to implement one or two RACH Msg3 transmissions using the techniques described above.

Figure 3:
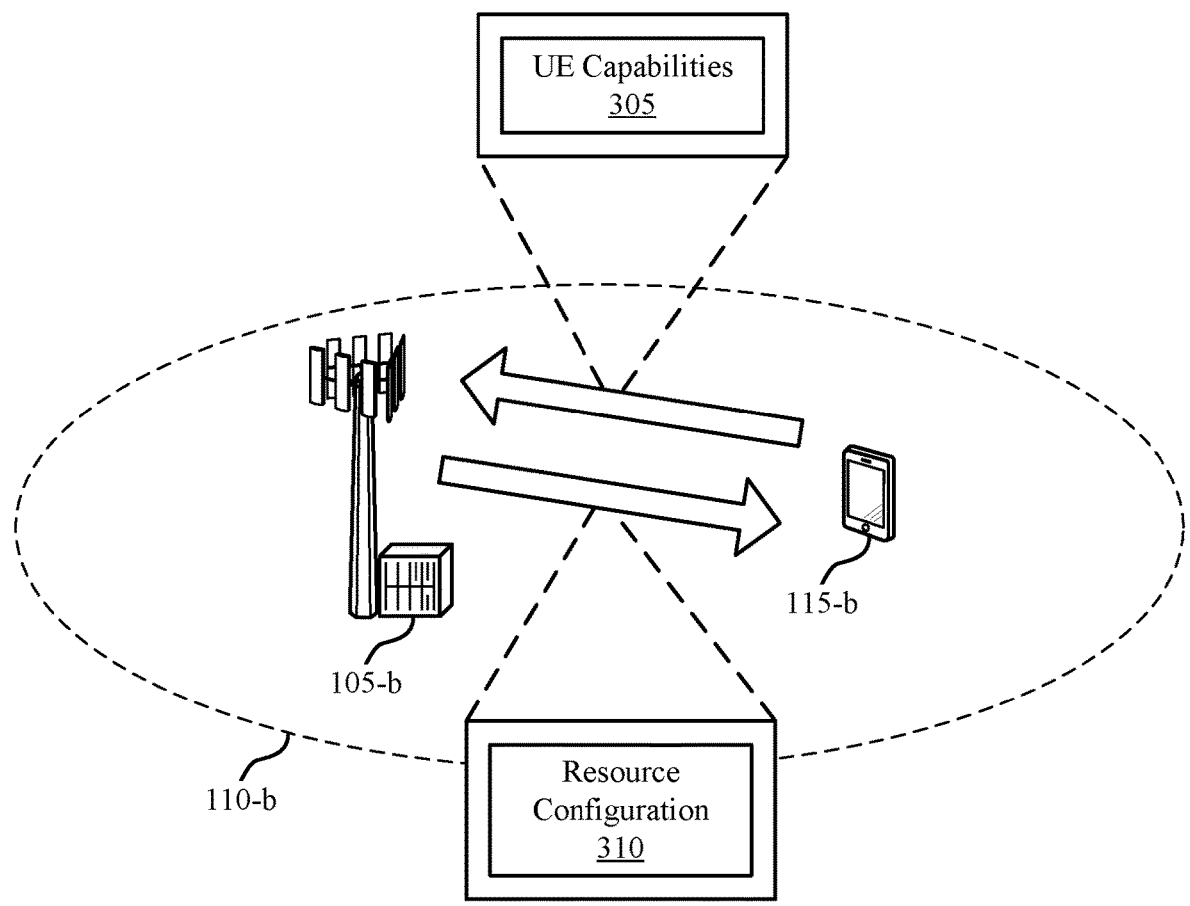

FIG. 3 illustrates an example of a wireless communication system 300 that supports determining a number of RACH preamble messages for transmission in accordance with aspects of the present disclosure. The wireless communication system 300 may include base station 105-*b*, geographic area 110-*b*, and UE 115-*b*, which may be examples of the corresponding devices and areas described with reference to FIGS. 1 and 2. Base station 105-*b* and UE 115-*b* may transmit multiple reference signals and multiple RACH preamble messages as described above, for example, using beam-formed or directional transmissions. Additionally or alternatively, base station 105-*b* may determine RACH resources for UE 115-*b* based on a received indication from UE 115-*b*. UE 115-*b* may transmit an indication of UE capabilities 305 to base station 105-*b* (or another base station 105 in the network) and may receive a resource configuration 310 in return. In some cases, base station 105-*b* may transmit multiple resource configurations 310 included within reference signals (e.g., SSBs, CSI-RSs, etc.) to UE 115-*a*.

In some RACH procedures (e.g., contention-free random access procedures), the number of RACH preamble messages to transmit may be based on the beam correspondence of UE 115-*b*. For example, if UE 115-*b* has beam correspondence, UE 115-*b* may associate a single uplink transmit beam with each downlink receive beam. Accordingly, UE 115-*b* may receive multiple reference signals on multiple downlink receive beams and may transmit one RACH preamble message per reference signal on the uplink transmit beam corresponding to each downlink receive beam. However, in some cases of beam correspondence, base station 105-*a* may configure multiple transmission opportunities in a reference signal (e.g., to handle latency issues during handover). For example, during a handover procedure, UE 115-*b* may miss one or more transmission opportunities indicated by a reference signal but may transmit in a later transmission opportunity indicated by the same reference signal if multiple RACH occasions are included, rather than wait to receive an additional reference signal with new transmission opportunities.

If UE 115-*b* does not have beam correspondence, UE 115-*b* may transmit using multiple uplink transmit beams for each reference signal received on a downlink receive beam (e.g., using a transmit beam sweep). For example, as UE 115-*b* does not associate each downlink beam with a single uplink beam, UE 115-*b* may try transmitting using multiple uplink beams to improve throughput and reliability of the RACH procedure. In such cases, the number of transmission opportunities for each reference signal may be based on a number of uplink transmit beams for UE 115-*b*. UE 115-*b* may transmit an indication of the number of uplink transmit beams in the UE capabilities 305, and base station 105-*b* may configure the RACH resources for UE 115-*b* accordingly. For example, if UE 115-*b* includes four uplink transmit beams, base station 105-*b* may include four RACH transmission opportunities for each reference signal. When UE 115-*b* receives one of these reference signals on a downlink receive beam, UE 115-*b* may transmit four RACH preamble messages (e.g., one in each of the transmission opportunities for the received reference signal), each using a different uplink transmit beam. In this way, UE 115-*b* and base station 105-*b* without beam correspondence may determine uplink and downlink beams to utilize resulting in the strongest received signals.

In some cases, UE 115-*b* may indicate multiple parameters to base station 105-*b* within the UE capabilities 305. For example, UE 115-*b* may indicate a maximum number of reference signals that UE 115-*b* can simultaneously detect from one or more base stations 105 (e.g., in some cases, above a certain reference signal receive power threshold). In other examples, UE 115-*b* may indicate with the UE capabilities 305 a number of sub-arrays, a number of receive panels, a number of UE diversity branches, a number of receive beams, a number of transmit beams (e.g., without beam correspondence, the number of beams to try a RACH preamble transmission for each received reference signal), a level of beam correspondence, or any combination of these parameters. Base station 105-*b* may determine RACH resources for UE 115-*b* based on any combination of these UE capabilities 305. For example, determining RACH resources may involve selecting a number of reference signals (e.g., SSBs, CSI-RSs, etc.) to transmit, selecting a number of RACH transmission opportunities to include within each reference signal, or both. Base station 105-*b* may transmit the determined resource configuration 310 (e.g., the number of reference signals to receive) to UE 115-*b* in a handover message, RRC signaling, a MAC control element (CE), downlink control information (DCI), a master information block (MIB), remaining system information (RMSI) (e.g., remaining minimum system information), other system information (OSI), or some combination of these. In some cases, base station 105-*b* may include some aspects of the resource configuration 310 within the reference signal transmissions.

UE 115-*b* may receive the RACH configuration 310, and may initiate a RACH procedure (e.g., a contention-free random access procedure) by transmitting one or more RACH preamble messages within a RAR window based on the received RACH configuration 310. In some RACH procedures (e.g., contention-based random access procedures), UE 115-*b* may not transmit these UE capabilities 305. Base station 105-*b* may instead configure RACH resources for UE 115-*b* based on a pre-determined maximum number of RACH preamble messages a UE 115 may transmit before receiving a RAR. In some cases, base station 105-*b* may transmit this pre-determined maximum number of RACH preamble messages to UE 115-*b* in the resource configuration 310. In other cases, UE 115-*b* and base station 105-*b* may both be configured with a same maximum pre-determined value.

Figure 4:
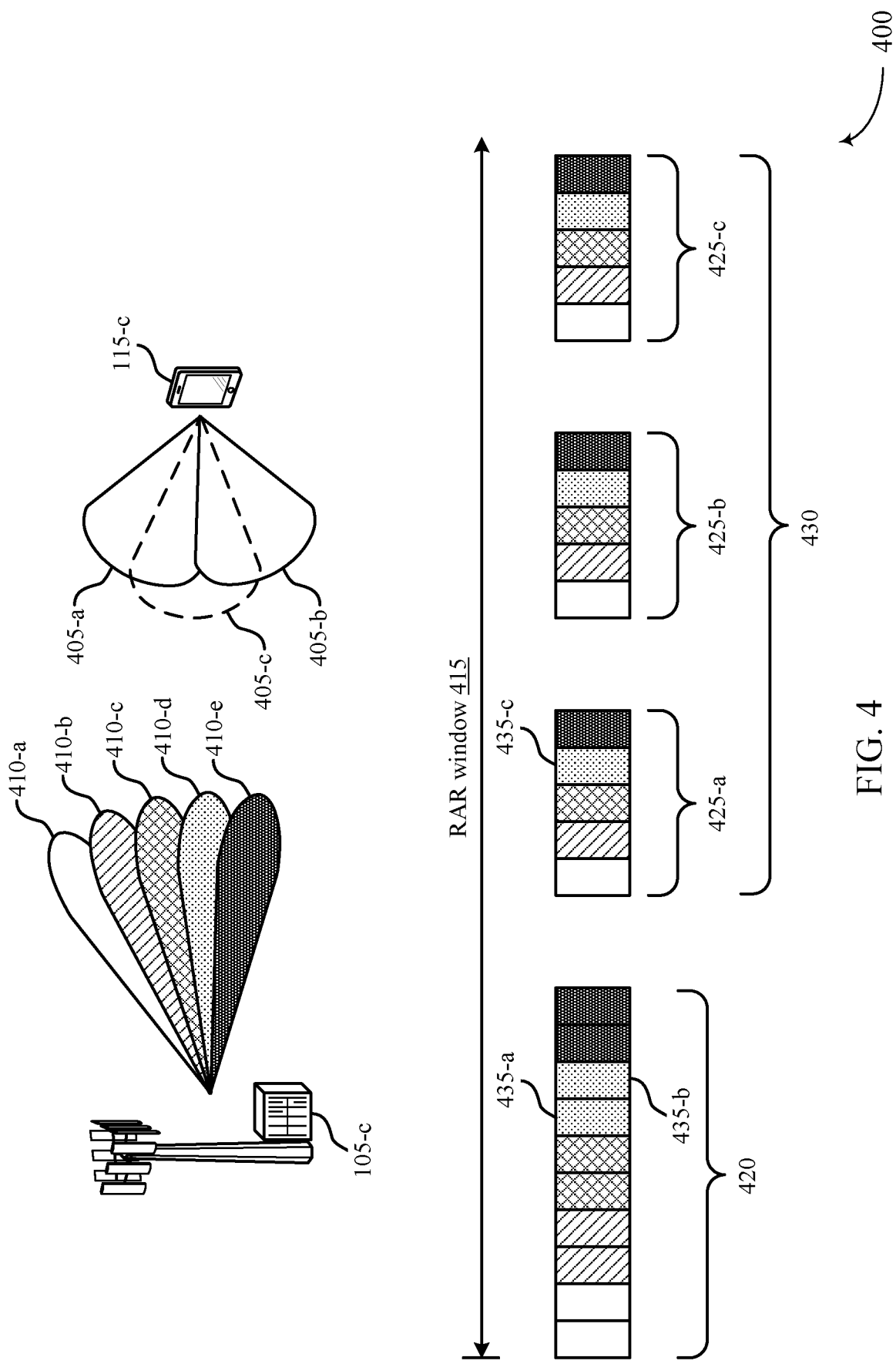
FIG. 4 illustrates an example of a RACH messaging configuration that supports determining a number of RACH preamble messages for transmission in accordance with aspects of the present disclosure.

FIG. 4 illustrates an example of a RACH messaging configuration 400 that supports determining a number of RACH preamble messages for transmission in accordance with aspects of the present disclosure. The RACH messaging configuration 400 may include UE 115-*c* transmitting RACH messages on the uplink to base station 105-*c*. UE 115-*c* and base station 105-*c* may be examples of the corresponding devices as described with reference to FIGS. 1, 2, and 3. As illustrated, UE 115-*c* may transmit the RACH messages using two uplink transmit beams 405 (e.g., uplink transmit beams 405-*a* and 405-*b*), and base station 105-*c* may transmit reference signals and RAR messages using five downlink transmit beams 410 (e.g., downlink transmit beams 410-*a*, 410-*b*, 410-*c*, 410-*d*, and 410-*e*). However, UE 115-*c* and base station 105-*c* may operate using any number of transmission and reception beams. UE 115-*c* may transmit multiple RACH preamble messages during a RAR window 415. For example, UE 115-*c* may transmit multiple RACH preamble messages in dedicated RACH resources 420 or common RACH resources 430 during the RAR window 415.

In the RACH messaging configuration 400, base station 105-*c* may allocate resources for UE 115-*c* to transmit RACH preamble messages on. For example, base station 105-*c* may generate or allocate dedicated RACH resources 420, which may include one or more TTIs (e.g., symbols, slots, etc.) for different uplink reception beams at base station 105-*c*. The dedicated RACH resources 420 may indicate RACH resources in the time domain, frequency domain, or preamble domain (e.g., a preamble sequence domain). In some cases, base station 105-*c* may configure UE 115-*c* to transmit a specific number of RACH messages in the dedicated RACH resources 420 and may include that specific number of TTIs for each uplink reception beam. Additionally or alternatively, base station 105-*c* may allocate periodic or aperiodic sets of common RACH resources 425 in a pool of common RACH resources 430. The dedicated RACH resources 420 and common RACH resources 430 may be distinct in the time domain. In some cases, each set of common RACH resources 425 may include one TTI per uplink reception beam. In contrast to including multiple TTIs per uplink reception beam, this may reduce overhead for the common RACH resources 430 during a RACH procedure.

In some cases, UE 115-c may transmit multiple RACH preamble messages in dedicated RACH resources 420. For example, UE 115-c may transmit a RACH preamble message using uplink transmit beam 405-a in resource 435-a and may transmit a second RACH preamble message using uplink transmit beam 405-b in resource 435-b within the same RAR window 415. For example, UE 115-c may transmit the second RACH preamble message prior to receiving a RAR message in response to the first RACH preamble message, but before the end of the RAR window 415. In other cases, UE 115-c may transmit one or more RACH preamble messages in dedicated RACH resources 420 and one or more RACH preamble messages in common RACH resources 430 (e.g., using resources 435-a and 435-c). In yet other cases, UE 115-c may transmit multiple RACH preamble messages in common RACH resources (e.g., in one or more sets of common RACH resources 425).

If UE 115-c does not have beam correspondence, UE 115-c may receive reference signals (e.g., synchronization signals) and RAR messages from base station 105-c on different beams 405 than used for RACH preamble message transmissions. For example, without beam correspondence, UE 115-c may receive a reference signal on downlink receive beam 405-c and may perform a beam sweep to transmit multiple RACH preamble messages using uplink transmit beams 405-a and 405-b using transmission opportunities indicated by the received reference signal. If UE 115-c has beam correspondence, UE 115-c may transmit RACH preamble messages using the same beams that UE 115-c receives reference signals, RAR messages, or both on. For example, UE 115-c may use the set of beams including beams 405-a and 405-b to both receive reference signals from base station 105-c and transmit RACH preamble messages to base station 105-c.

In multi-beam systems, such as the system described with reference to the RACH messaging configuration 400, UE 115-c may transmit multiple RACH preamble messages to base station 105-c using different techniques. In a first example, UE 115-c may transmit multiple RACH preamble messages corresponding to a same reference signal (e.g., an SSB or CSI-RS) with different uplink transmit beams 405 (e.g., to implement a beam sweep). In a second example, UE 115-c may transmit multiple RACH preamble messages corresponding to a same reference signal with a same uplink transmit beam 405 (e.g., to improve the link budget of the RACH procedure). In a third example UE 115-c may transmit multiple RACH preamble messages corresponding to different reference signals with different uplink transmit beams 405 (e.g., either in interleaved or non-interleaved RAR windows 415, to improve RACH throughput).

In the second example described above, UE 115-c may transmit multiple RACH preamble messages in dedicated RACH resources 420 if UE 115-c and base station 105-c support configurations with multiple dedicated RACH transmission opportunities in the time domain (e.g., in a contention-free RACH procedure). For example, UE 115-c may transmit multiple RACH preamble messages to base station 105-c within RAR window 415 using uplink transmit beam 405-a. Base station 105-c may non-coherently combine the received RACH preamble messages to determine a single RACH preamble transmitted across the multiple RACH preamble transmission opportunities. Such a procedure may improve the link budget for contention-free random access.

In some cases, in order to improve the link budget of the RACH procedure, base station 105-c may determine a number of RACH preamble messages (e.g., Msg1 signals) to non-coherently combine, and may transmit an indication of this number of RACH preamble messages to UE 115-c. This indication may configure the number of consecutive RACH preamble messages for UE 115-c to transmit using the same uplink transmit beam 405-a before expiration of the RAR window 415. Instead of randomly selecting a set of preambles or resources for the multiple RACH preamble message transmissions, UE 115-c may transmit the indicated number of RACH preamble messages to base station 105-c. As base station 105-c is aware of the number of expected RACH preamble messages from UE 115-c, base station 105-c may combine the RACH preamble transmitted across the indicated number of RACH transmission opportunities to efficiently improve the link budget for the random-access procedure.

In the third example described above, UE 115-c may transmit multiple RACH preamble messages in interleaved or overlapped RAR windows 415. For overlapped RAR windows 415, UE 115-c may transmit multiple RACH preamble messages corresponding to different reference signals if UE 115-c supports simultaneously monitoring the different reference signals (e.g., SSBs, CSI-RSs, or both). In some cases, simultaneously monitoring may refer to UE 115-c simultaneously receiving the different reference signals on different diversity branches or digital chains. In some cases, simultaneous monitoring may refer to UE 115-c receiving the different reference signals using a same downlink receive beam 405 above a certain reference signal receive power threshold or RAR block error rate (BLER) threshold. For example, if UE 115-c may monitor a set of reference signals, UE 115-c may similarly support monitoring a set of RAR message (e.g., Msg2) transmissions that are spatially quasi-co-located with the set of reference signals. Accordingly, multiple RAR windows 415 associated with different reference signals may overlap, allowing UE 115-c to transmit multiple RACH preamble message transmissions with overlapping RAR windows 415.

Figure 5:
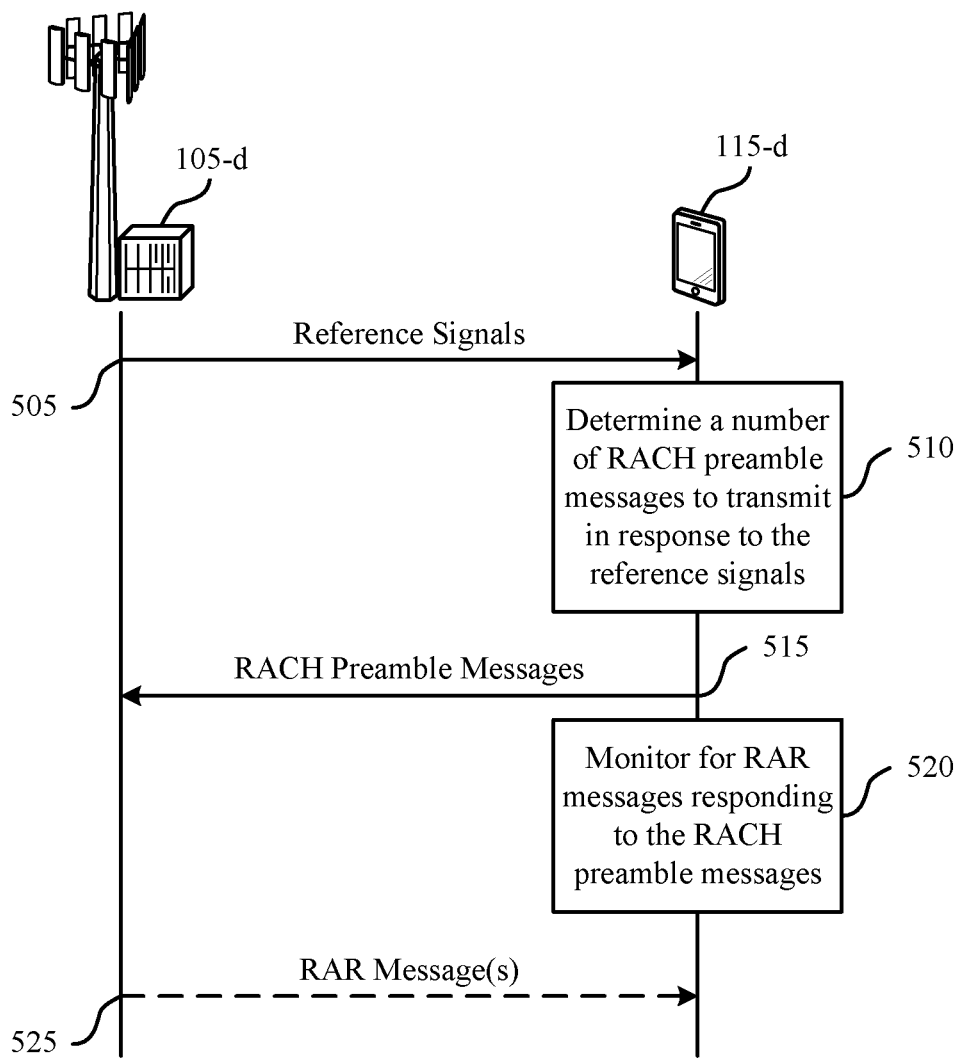
FIGS. 5 and 6 illustrate examples of process flows that support determining a number of RACH preamble messages for transmission in accordance with aspects of the present disclosure.

FIG. 5 illustrates a process flow 500 that supports determining a number of RACH preamble messages for transmission in accordance with aspects of the present disclosure. The process flow 500 may include base station 105-d and UE 115-d, which may be examples of the corresponding devices as described with reference to FIGS. 1, 2, 3, and 4. UE 115-d may determine a number of RACH preamble messages to transmit within a RAR window based on the capabilities of UE 115-d.

At 505, base station 105-d may transmit multiple reference signals (e.g., SSBs, CSI-RSs, or similar reference signals associated with RACH occasions) to UE 115-d, where each references signal corresponds to at least one transmission opportunity for a RACH preamble message transmission.

At 510, UE 115-d may determine a number of RACH preamble messages to transmit (e.g., within a RAR window) in response to the received reference signals. UE 115-d may determine the number of RACH preamble messages based on the capability of UE 115-d to simultaneously (e.g., at a same instant in time, during a same time window, during a same TTI, etc.) monitor for RAR messages in response to each of the RACH preamble messages.

At 515, UE 115-d may transmit the number of RACH preamble messages to base station 105-d. In some cases, UE 115-d may transmit the RACH preamble messages within a same RAR window. UE 115-d may transmit each RACH preamble message in a transmission opportunity of one of the received reference signals.

At 520, UE 115-*d* may monitor for RAR messages in response to the multiple transmitted RACH preamble messages. For example, UE 115-*d* may simultaneously monitor for a RAR message in response to each of the transmitted RACH preamble messages. If UE 115-*d* transmitted a RACH preamble message in a transmission opportunity of a reference signal received on a first downlink receive beam, UE 115-*d* may monitor for the RAR in response to that RACH preamble message on the same first downlink receive beam.

At 525, base station 105-*d* may transmit one or more RAR messages to UE 115-*d* in response to the multiple received RACH preamble messages. For example, if base station 105-*d* receives multiple RACH preamble messages within a RAR window, base station 105-*d* may either transmit one RAR message in response to UE 115-*d* (e.g., selected randomly, based on an order of the received or decoded RACH preamble messages, or based on a receive or transmit power) or may transmit multiple RAR messages in response to UE 115-*d* (e.g., for each RACH preamble message, or for a subset of the RACH preamble messages). If base station 105-*d* transmits multiple RAR messages at 525, UE 115-*d* may receive a first RAR message and stop monitoring for additional pending RAR messages or may continue monitoring in order to possibly received multiple RAR messages in response to the multiple RACH preamble messages.

Figure 6:
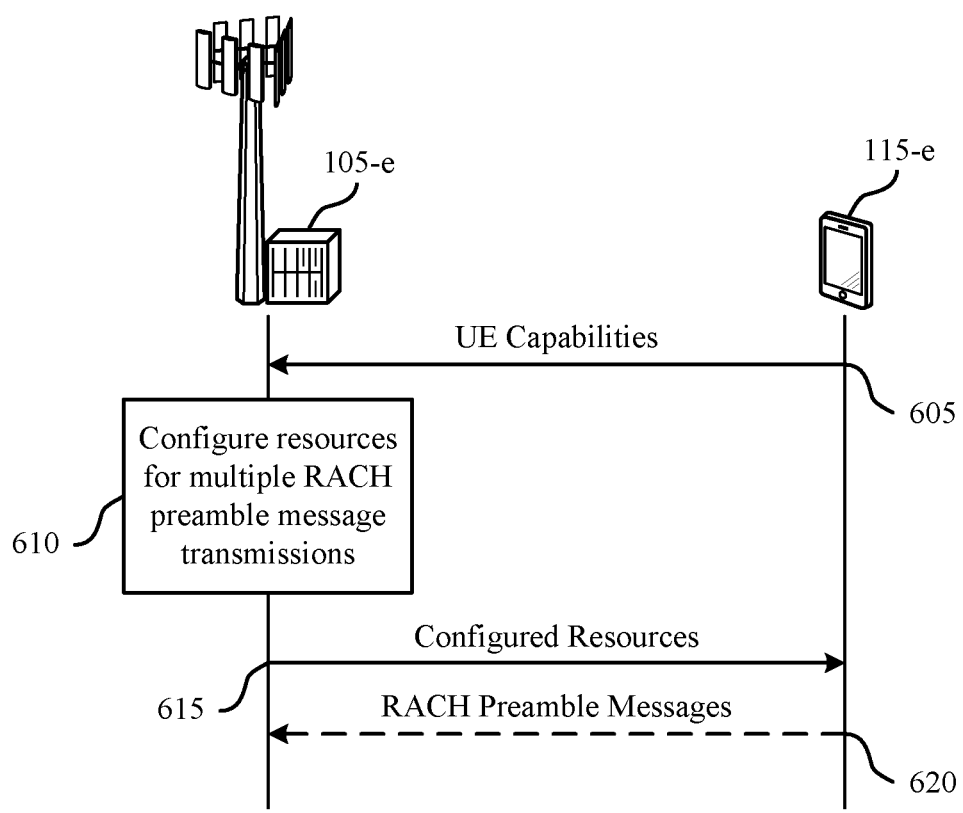

FIG. 6 illustrates a process flow 600 that supports determining a number of RACH preamble messages for transmission in accordance with various aspects of the present disclosure. The process flow 600 may include base station 105-*e* and UE 115-*e*, which may be examples of the corresponding devices as described with reference to FIGS. 1, 2, 3, 4, and 5. Base station 105-*e* may configure UE 115-*e* for transmission of multiple RACH preamble messages within a RAR window based on the capabilities of UE 115-*e*.

At 605, UE 115-*e* may transmit an indication of capabilities for UE 115-*e*. In some cases, these UE capabilities may include a maximum number of reference signals that UE 115-*e* may detect or receive from one or more base stations 105 simultaneously (e.g., at a receive strength greater than some static or dynamic reference signal receive strength threshold). In some cases, these UE capabilities may include a number of sub-arrays, a number of receive panels, a number of UE diversity branches, a number of downlink receive beams, a number of uplink transmit beams, a level of beam correspondence, or any combination of these or other relevant UE parameters.

At 610, base station 105-*e* may configure resources for multiple RACH preamble message transmissions (e.g., within a single RAR window) based on the received UE capabilities for UE 115-*e*. These configured resources may include a number of reference signals to transmit, a number of RACH transmission opportunities for each reference signal, specific times or frequencies for the RACH transmissions, or any combination of these or other relevant RACH resource configuration parameters.

At 615, base station 105-*e* may transmit an indication of the configured resources to UE 115-*e*. For example, base station 105-*e* may transmit the resource configuration in a handover message, RRC signaling, a MAC CE, DCI, an MIB, RMSI, OSI, reference signals, or any combination of these or other downlink transmissions.

At 620, UE 115-*e* may transmit multiple RACH preamble messages to base station 105-*e* according to the resource configuration (e.g., in response to multiple reference signals and/or reference signal-specific RACH transmission opportunities).

Figure 7:
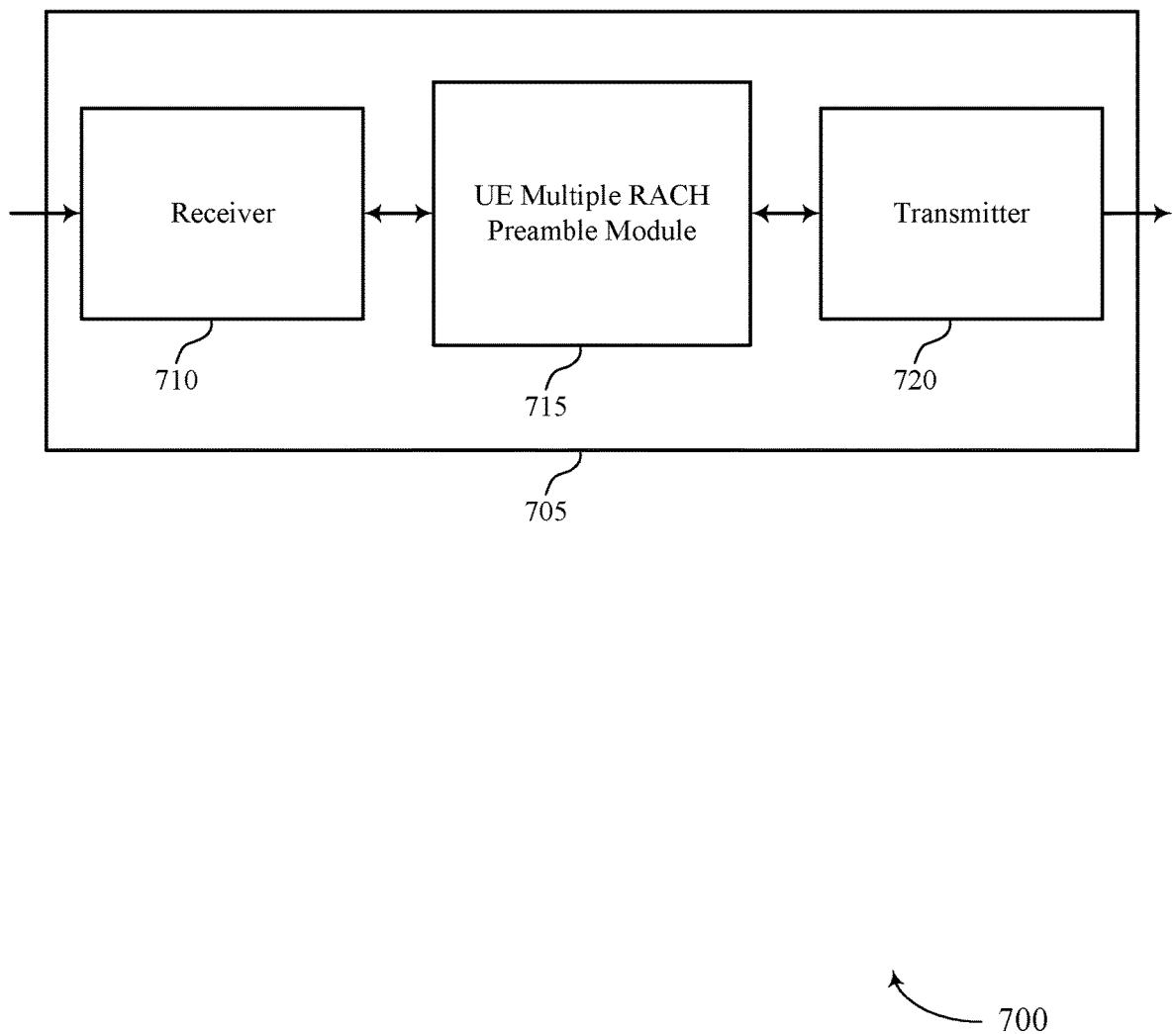
FIGS. 7 through 9 show block diagrams of a device that supports determining a number of RACH preamble messages for transmission in accordance with aspects of the present disclosure.

FIG. 7 shows a block diagram 700 of a wireless device 705 that supports determining a number of RACH preamble messages for transmission in accordance with aspects of the present disclosure. Wireless device 705 may be an example of aspects of a UE 115 as described herein. Wireless device 705 may include receiver 710, UE multiple RACH preamble module 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to determining a number of RACH preamble messages for transmission, etc.). Information may be passed on to other components of the device. The receiver 710 may be an example of aspects of the transceiver 1035 described with reference to FIG. 10. The receiver 710 may utilize a single antenna or a set of antennas.

UE multiple RACH preamble module 715 may be an example of aspects of the UE multiple RACH preamble module 1015 described with reference to FIG. 10.

UE multiple RACH preamble module 715 and/or at least some of its various sub-components may be implemented in hardware, software executed by a processor, firmware, or any combination thereof. If implemented in software executed by a processor, the functions of the UE multiple RACH preamble module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE multiple RACH preamble module 715 and/or at least some of its various sub-components may be physically located at various positions, including being distributed such that portions of functions are implemented at different physical locations by one or more physical devices. In some examples, UE multiple RACH preamble module 715 and/or at least some of its various sub-components may be a separate and distinct component in accordance with various aspects of the present disclosure. In other examples, UE multiple RACH preamble module 715 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

In some cases, UE multiple RACH preamble module 715 may receive a set of reference signals, where each reference signal of the set of reference signals corresponds to at least one transmission opportunity for a RACH preamble message transmission, determine a number of RACH preamble messages to transmit in response to the received set of reference signals, where the determining is based on a capability of the UE to simultaneously monitor for RAR messages for each of the corresponding RACH preamble messages, and transmit the determined number of RACH preamble messages (e.g., in a RAR window) based on the determining, where each RACH preamble message of the number of RACH preamble messages corresponds to a reference signal of the received set of reference signals. Additionally or alternatively, the UE multiple RACH preamble module 715 may transmit an indication of one or more capabilities of the UE, receive an indication of configured resources for multiple RACH preamble message transmissions (e.g., within a RAR window) based on the one or more capabilities of the UE, and transmit a number of RACH preamble messages according to the configured resources.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
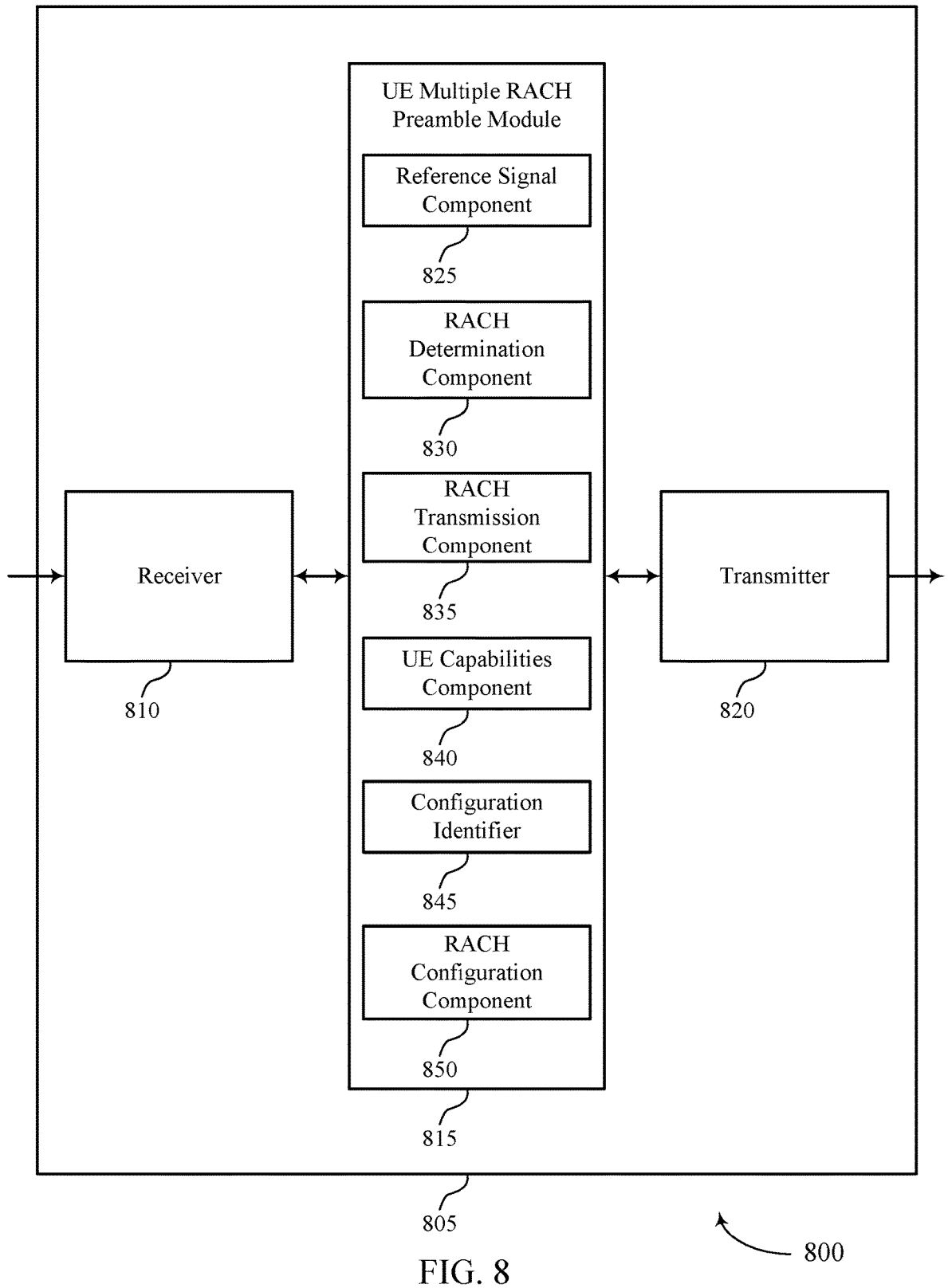

FIG. 8 shows a block diagram 800 of a wireless device 805 that supports determining a number of RACH preamble messages for transmission in accordance with aspects of the present disclosure. Wireless device 805 may be an example of aspects of a wireless device 705 or a UE 115 as described with reference to FIG. 7. Wireless device 805 may include receiver 810, UE multiple RACH preamble module 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to determining a number of RACH preamble messages for transmission, etc.). Information may be passed on to other components of the device. The receiver 810 may be an example of aspects of the transceiver 1035 described with reference to FIG. 10. The receiver 810 may utilize a single antenna or a set of antennas.

UE multiple RACH preamble module 815 may be an example of aspects of the UE multiple RACH preamble module 1015 described with reference to FIG. 10. UE multiple RACH preamble module 815 may also include reference signal component 825, RACH determination component 830, RACH transmission component 835, UE capabilities component 840, configuration identifier 845, and RACH configuration component 850.

Reference signal component 825 may receive a set of reference signals, where each reference signal of the set of reference signals corresponds to at least one transmission opportunity for a RACH preamble message transmission. In some cases, the set of reference signals includes SSBs, CSI-RSs, or a combination thereof.

RACH determination component 830 may determine a number of RACH preamble messages to transmit in response to the received set of reference signals, where the determining is based on a capability of the UE to simultaneously monitor for RAR messages for each of the corresponding RACH preamble messages. In some cases, the capability of the UE to monitor for RAR messages for each of the corresponding RACH preamble messages is based on a number of sub-arrays, a number of receive panels, a number of UE diversity branches, a number of reference signals received on each receive beam, or a combination thereof. In some cases, at least one of the number of RACH preamble messages corresponds to a contention-free RACH procedure. In some cases, at least one of the number of RACH preamble messages corresponds to a contention-based RACH procedure. In some cases, determining the number of RACH preamble messages to transmit is further based on a maximum number of RACH preamble messages to transmit within the RAR window.

RACH transmission component 835 may transmit the determined number of RACH preamble messages (e.g., in a RAR window) based on the determining, where each RACH preamble message of the number of RACH preamble messages corresponds to a reference signal of the received set of reference signals. In some cases, transmitting the number of RACH preamble messages includes transmitting multiple RACH preamble messages corresponding to a same reference signal of the set of references signals within the RAR window based on the same reference signal corresponding to multiple transmission opportunities for RACH preamble message transmissions. In some cases, the RAR window corresponds to a first RACH preamble message of the number of RACH preamble messages.

UE capabilities component 840 may transmit an indication of one or more capabilities of the UE. In some cases, the one or more capabilities include a maximum number of reference signals that the UE can detect from one or more base stations simultaneously. In some cases, the UE can simultaneously detect the maximum number of reference signals with reference signal receive powers greater than a reference signal receive power threshold. In some cases, the reference signals include synchronization signal blocks, CSI-RSs, or a combination thereof. In some cases, the one or more capabilities include a number of sub-arrays, a number of receive panels, a number of UE diversity branches, a number of receive beams, a number of transmit beams, or a combination thereof. In some cases, the one or more capabilities include a level of beam correspondence for the UE.

Configuration identifier 845 may receive an indication of configured resources for multiple RACH preamble message transmissions (e.g., within a RAR window) based on the one or more capabilities of the UE. In some cases, the indication of the configured resources includes a handover message, RRC signaling, a MAC CE, DCI, an MIB, RMSI, OSI, or a combination thereof. In some cases, the configured resources correspond to a contention-free RACH procedure.

RACH configuration component 850 may transmit a number of RACH preamble messages according to the configured resources.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
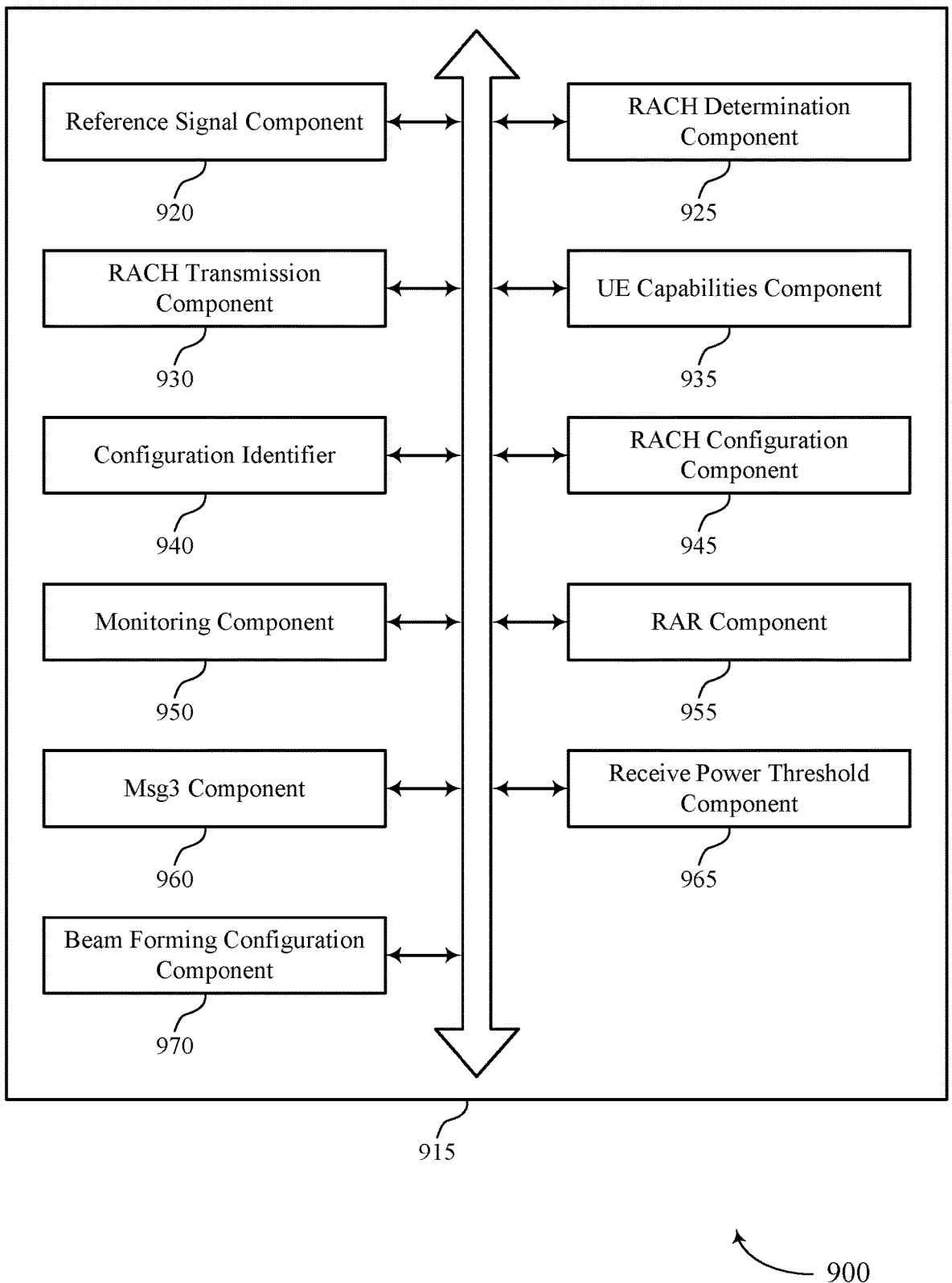

FIG. 9 shows a block diagram 900 of a UE multiple RACH preamble module 915 that supports determining a number of RACH preamble messages for transmission in accordance with aspects of the present disclosure. The UE multiple RACH preamble module 915 may be an example of aspects of a UE multiple RACH preamble module 715, a UE multiple RACH preamble module 815, or a UE multiple RACH preamble module 1015 described with reference to FIGS. 7, 8, and 10. The UE multiple RACH preamble module 915 may include reference signal component 920, RACH determination component 925, RACH transmission component 930, UE capabilities component 935, configuration identifier 940, RACH configuration component 945, monitoring component 950, RAR component 955, Msg3 component 960, receive power threshold component 965, and beam forming configuration component 970. Each of these modules may communicate, directly or indirectly, with one another (e.g., via one or more buses).

Reference signal component 920 may receive a set of reference signals, where each reference signal of the set of reference signals corresponds to at least one transmission opportunity for a RACH preamble message transmission. In some cases, the set of reference signals includes SSBs, CSI-RSs, or a combination thereof.

RACH determination component 925 may determine a number of RACH preamble messages to transmit in response to the received set of reference signals, where the determining is based on a capability of the UE to simultaneously monitor for RAR messages for each of the corresponding RACH preamble messages. In some cases, the capability of the UE to monitor for RAR messages for each of the corresponding RACH preamble messages is based on a number of sub-arrays, a number of receive panels, a number of UE diversity branches, a number of reference signals received on each receive beam, or a combination thereof. In some cases, at least one of the number of RACH preamble messages corresponds to a contention-free RACH procedure. In some cases, at least one of the number of RACH preamble messages corresponds to a contention-based RACH procedure. In some cases, the determining the number of RACH preamble messages to transmit is further based on a maximum number of RACH preamble messages to transmit within the RAR window.

RACH transmission component 930 may transmit the determined number of RACH preamble messages (e.g., in a RAR window) based on the determining, where each RACH preamble message of the number of RACH preamble messages corresponds to a reference signal of the received set of reference signals. Transmitting the number of RACH preamble messages in a RAR window may involve transmitting at least one RACH preamble message of the determined number of RACH preamble messages before expiration of the RAR window, where the RAR window corresponds to a previously transmitted RACH preamble message. In some cases, transmitting the number of RACH preamble messages includes transmitting multiple RACH preamble messages corresponding to a same reference signal of the set of references signals within the RAR window based on the same reference signal corresponding to multiple transmission opportunities for RACH preamble message transmissions. In some cases, the RAR window corresponds to a first RACH preamble message of the number of RACH preamble messages.

UE capabilities component 935 may transmit an indication of one or more capabilities of the UE. In some cases, the one or more capabilities include a maximum number of reference signals that the UE can detect from one or more base stations simultaneously. In some cases, the UE can simultaneously detect the maximum number of reference signals with reference signal receive powers greater than a reference signal receive power threshold. In some cases, the reference signals include SSBs, CSI-RSs, or a combination thereof. In some cases, the one or more capabilities include a number of sub-arrays, a number of receive panels, a number of UE diversity branches, a number of receive beams, a number of transmit beams, or a combination thereof. In some cases, the one or more capabilities include a level of beam correspondence for the UE.

Configuration identifier 940 may receive an indication of configured resources for multiple RACH preamble message transmissions (e.g., within a RAR window) based on the one or more capabilities of the UE. In some cases, the indication of the configured resources includes a handover message, RRC signaling, a MAC CE, DCI, an MIB, RMSI, OSI, or a combination thereof. In some cases, the configured resources correspond to a contention-free RACH procedure.

RACH configuration component 945 may transmit a number of RACH preamble messages according to the configured resources.

Monitoring component 950 may monitor for a set of RAR messages, where each RAR message of the set of RAR messages is in response to an associated RACH preamble message of the number of RACH preamble messages. In some cases, monitoring component 950 may halt the monitoring based on receiving a first RAR message in response to the one or more of the number of RACH preamble messages. In some cases, each reference signal of the set of reference signals is received on a particular receive beam, where monitoring for the set of RAR messages includes monitoring for each RAR message on the particular receive beam for the reference signal corresponding to the associated RACH preamble message.

RAR component 955 may receive one or more RAR messages in response to one or more of the number of RACH preamble messages or may receive a single RAR message in response to multiple RACH preamble messages.

In some cases, Msg3 component 960 may select one RAR message from multiple received RAR messages based on a receiving order of the multiple received RAR messages, indicated RACH Msg3 transmission powers for the multiple received RAR messages, estimated receive powers for the multiple received RAR messages, a pseudo-random selection process, or a combination thereof, and may transmit a single RACH Msg3 in response to the multiple received RAR messages based on the selecting, In other cases, Msg3 component 960 may transmit multiple RACH Msg3 transmissions in response to multiple received RAR messages.

Receive power threshold component 965 may determine the reference signal receive power threshold based on a network configuration. In some cases, determining the number of RACH preamble messages to transmit is further based on whether each reference signal of the set of reference signals is received at a reference signal receive power greater than a reference signal receive power threshold. In some cases, each reference signal of the set of reference signals is simultaneously received at the reference signal receive power greater than the reference signal receive power threshold. In some cases, each reference signal of the set of reference signals is received with a same beam at the reference signal receive power greater than the reference signal receive power threshold.

Beam forming configuration component 970 may receive a set of reference signals, where a number of transmission opportunities for RACH preamble message transmissions for each reference signal of the set of reference signals is based on a number of transmit beams for the UE to use for each receive beam.

Figure 10:
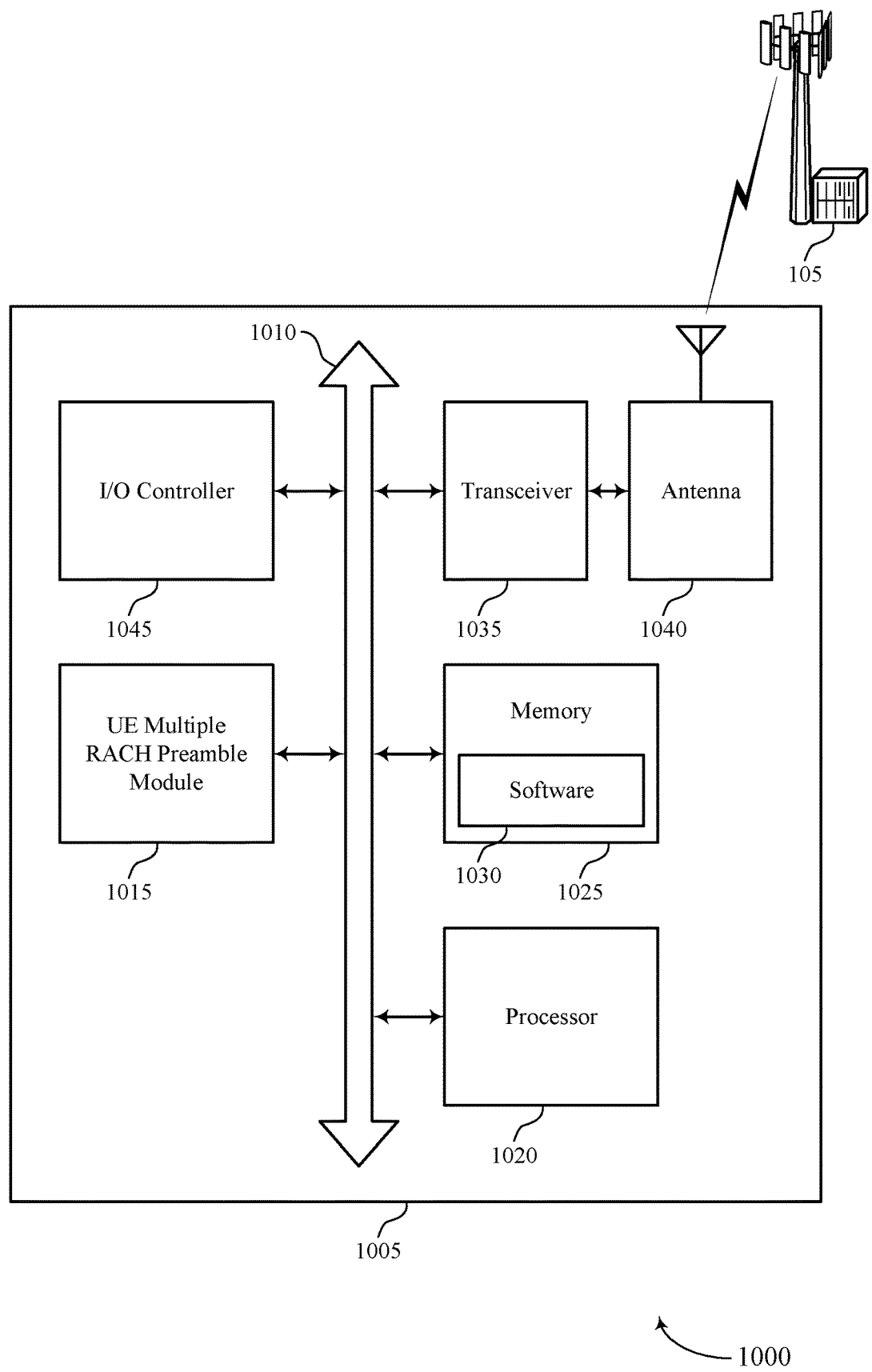
FIG. 10 illustrates a block diagram of a system including a device that supports determining a number of RACH preamble messages for transmission in accordance with aspects of the present disclosure.

FIG. 10 shows a diagram of a system 1000 including a device 1005 that supports determining a number of RACH preamble messages for transmission in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE multiple RACH preamble module 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105. UE multiple RACH preamble module 1015 may be an example of the UE multiple RACH preamble module 715, the UE multiple RACH preamble module 815, or the UE multiple RACH preamble module 915 described with reference to FIGS. 7 through 9.

Processor 1020 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting determining a number of RACH preamble messages for transmission).

Memory 1025 may include random access memory (RAM) and read-only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support determining a number of RACH preamble messages for transmission. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
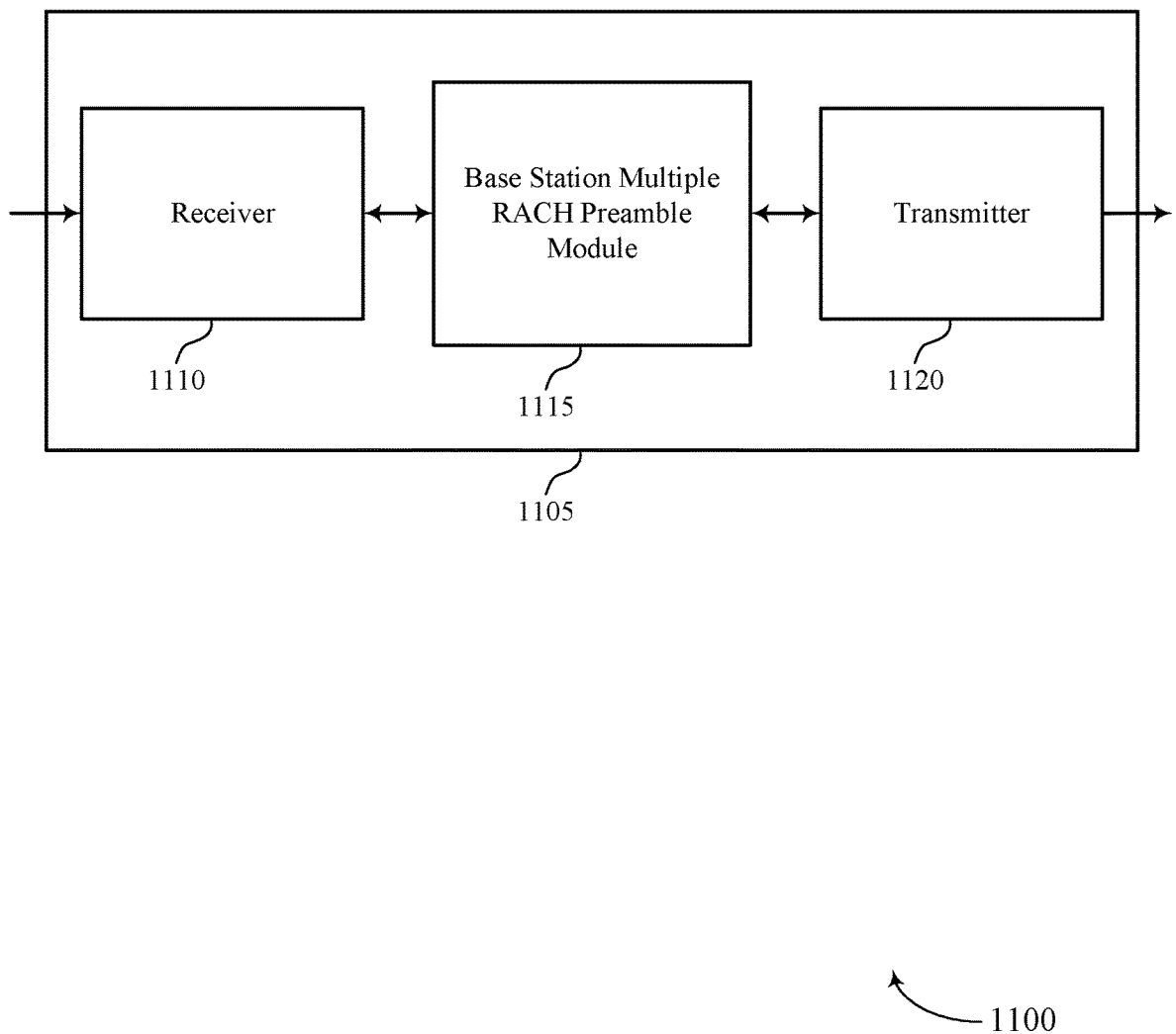
FIGS. 11 through 13 show block diagrams of a wireless device that supports determining a number of RACH preamble messages for transmission in accordance with aspects of the present disclosure.

FIG. 11 shows a block diagram 1100 of a wireless device 1105 that supports determining a number of RACH preamble messages for transmission in accordance with aspects of the present disclosure. Wireless device 1105 may be an example of aspects of a base station 105 as described herein. Wireless device 1105 may include receiver 1110, base station multiple RACH preamble module 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to determining a number of RACH preamble messages for transmission, etc.). Information may be passed on to other components of the device. The receiver 1110 may be an example of aspects of the transceiver 1435 described with reference to FIG. 14. The receiver 1110 may utilize a single antenna or a set of antennas.

Base station multiple RACH preamble module 1115 may be an example of aspects of the base station multiple RACH preamble module 1415 described with reference to FIG. 14.

Base station multiple RACH preamble module 1115 and/or at least some of its various sub-components may be implemented in hardware, software executed by a processor, firmware, or any combination thereof. If implemented in software executed by a processor, the functions of the base station multiple RACH preamble module 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station multiple RACH preamble module 1115 and/or at least some of its various sub-components may be physically located at various positions, including being distributed such that portions of functions are implemented at different physical locations by one or more physical devices. In some examples, base station multiple RACH preamble module 1115 and/or at least some of its various sub-components may be a separate and distinct component in accordance with various aspects of the present disclosure. In other examples, base station multiple RACH preamble module 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, base station multiple RACH preamble module 1115 may transmit a set of reference signals, where each reference signal of the set of reference signals corresponds to at least one transmission opportunity for a RACH preamble message transmission, receive, from a UE, a number of RACH preamble messages (e.g., in a RAR window) based on a capability of the UE to simultaneously monitor for RAR messages in response to the number of RACH preamble messages, where each RACH preamble message of the number of RACH preamble messages corresponds to a reference signal of the set of reference signals, and transmit at least one RAR message in response to the number of RACH preamble messages. Additionally or alternatively, the base station multiple RACH preamble module 1115 may receive an indication of one or more capabilities of a UE, configure resources for multiple RACH preamble message transmissions (e.g., within a RAR window) based on the one or more capabilities of the UE, and transmit, to the UE, an indication of the configured resources.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
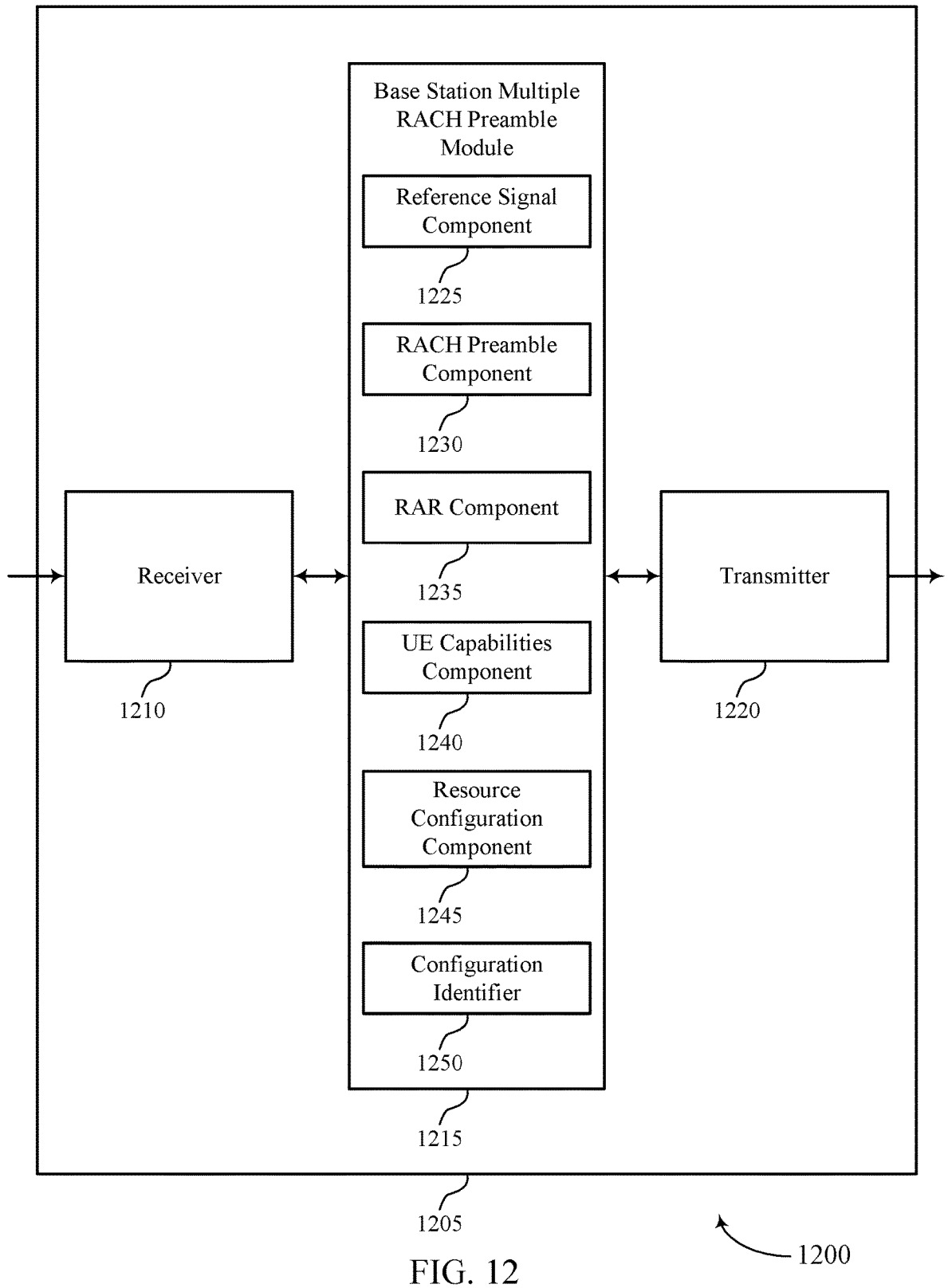

FIG. 12 shows a block diagram 1200 of a wireless device 1205 that supports determining a number of RACH preamble messages for transmission in accordance with aspects of the present disclosure. Wireless device 1205 may be an example of aspects of a wireless device 1105 or a base station 105 as described with reference to FIG. 11. Wireless device 1205 may include receiver 1210, base station multiple RACH preamble module 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to determining a number of RACH preamble messages for transmission, etc.). Information may be passed on to other components of the device. The receiver 1210 may be an example of aspects of the transceiver 1435 described with reference to FIG. 14. The receiver 1210 may utilize a single antenna or a set of antennas.

Base station multiple RACH preamble module 1215 may be an example of aspects of the base station multiple RACH preamble module 1415 described with reference to FIG. 14. Base station multiple RACH preamble module 1215 may also include reference signal component 1225, RACH preamble component 1230, RAR component 1235, UE capabilities component 1240, resource configuration component 1245, and configuration identifier 1250.

Reference signal component 1225 may transmit a set of reference signals, where each reference signal of the set of reference signals corresponds to at least one transmission opportunity for a RACH preamble message transmission.

RACH preamble component 1230 may receive, from a UE, a number of RACH preamble messages (e.g., in a RAR window) based on a capability of the UE to simultaneously monitor for RAR messages in response to the number of RACH preamble messages, where each RACH preamble message of the number of RACH preamble messages corresponds to a reference signal of the set of reference signals.

RAR component 1235 may transmit at least one RAR message in response to the number of RACH preamble messages. In some cases, transmitting the at least one RAR message includes transmitting a single RAR message in response to the number of RACH preamble messages. In other cases, transmitting the at least one RAR message includes transmitting a RAR message in response to each received RACH preamble message of the number of RACH preamble messages. In some cases, the at least one RAR message is transmitted in the RAR window.

UE capabilities component 1240 may receive an indication of one or more capabilities of a UE. In some cases, the one or more capabilities include a maximum number of reference signals that the UE can detect from one or more base stations within a time window. In some cases, the maximum number of reference signals is based on a reference signal receive power threshold. In some cases, the reference signals include SSBs, CSI-RSs, or a combination thereof. In some cases, the one or more capabilities include a number of sub-arrays, a number of receive panels, a number of UE diversity branches, a number of receive beams, a number of transmit beams, or a combination thereof. In some cases, the one or more capabilities include a level of beam correspondence for the UE.

Resource configuration component 1245 may configure resources for multiple RACH preamble message transmissions (e.g., within a RAR window) based on the one or more capabilities of the UE. In some cases, the configured resources correspond to a contention-free RACH procedure.

Configuration identifier 1250 may transmit, to the UE, an indication of the configured resources. In some cases, the indication of the configured resources includes a handover message, RRC signaling, a MAC CE, DCI, an MIB, RMSI, OSI, or a combination thereof.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
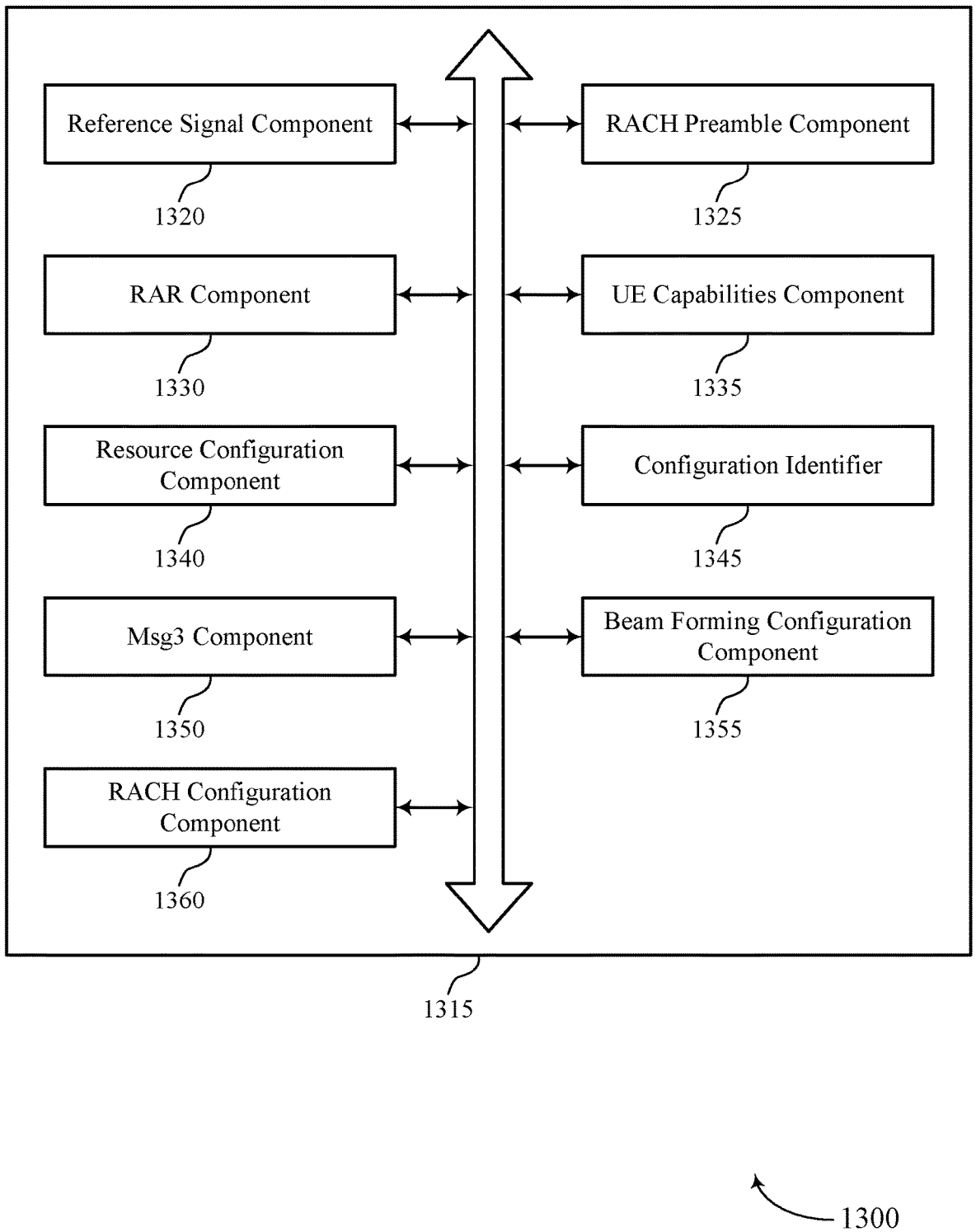

FIG. 13 shows a block diagram 1300 of a base station multiple RACH preamble module 1315 that supports determining a number of RACH preamble messages for transmission in accordance with aspects of the present disclosure. The base station multiple RACH preamble module 1315 may be an example of aspects of a base station multiple RACH preamble module 1415 described with reference to FIGS. 11, 12, and 14. The base station multiple RACH preamble module 1315 may include reference signal component 1320, RACH preamble component 1325, RAR component 1330, UE capabilities component 1335, resource configuration component 1340, configuration identifier 1345, Msg3 component 1350, beam forming configuration component 1355, and RACH configuration component 1360. Each of these modules may communicate, directly or indirectly, with one another (e.g., via one or more buses).

Reference signal component 1320 may transmit a set of reference signals, where each reference signal of the set of reference signals corresponds to at least one transmission opportunity for a RACH preamble message transmission.

RACH preamble component 1325 may receive, from a UE, a number of RACH preamble messages (e.g., in a RAR window) based on a capability of the UE to simultaneously monitor for RAR messages in response to the number of RACH preamble messages, where each RACH preamble message of the number of RACH preamble messages corresponds to a reference signal of the set of reference signals. Receiving the number of RACH preamble messages in a RAR window may involve receiving at least one RACH preamble message of the number of RACH preamble messages before expiration of the RAR window, where the RAR window corresponds to a previously received RACH preamble message.

RAR component 1330 may transmit at least one RAR message in response to the number of RACH preamble messages. In some cases, transmitting the at least one RAR message includes transmitting a single RAR message in response to the number of RACH preamble messages. In other cases, transmitting the at least one RAR message includes transmitting a RAR message in response to each received RACH preamble message of the number of RACH preamble messages. In some cases, the at least one RAR message is transmitted in the RAR window.

UE capabilities component 1335 may receive an indication of one or more capabilities of a UE. In some cases, the one or more capabilities include a maximum number of reference signals that the UE can detect from one or more base stations within a time window. In some cases, the maximum number of reference signals is based on a reference signal receive power threshold. In some cases, the reference signals include SSBs, CSI-RSs, or a combination thereof. In some cases, the one or more capabilities include a number of sub-arrays, a number of receive panels, a number of UE diversity branches, a number of receive beams, a number of transmit beams, or a combination thereof. In some cases, the one or more capabilities include a level of beam correspondence for the UE.

Resource configuration component 1340 may configure resources for multiple RACH preamble message transmissions (e.g., within a RAR window) based on the one or more capabilities of the UE. In some cases, the configured resources correspond to a contention-free RACH procedure.

Configuration identifier 1345 may transmit, to the UE, an indication of the configured resources. In some cases, the indication of the configured resources includes a handover message, RRC signaling, a MAC CE, DCI, an MIB, RMSI, OSI, or a combination thereof.

Msg3 component 1350 may receive one or more RACH Msg3 transmissions in response to the at least one RAR message.

Beam forming configuration component 1355 may transmit a set of reference signals, where a number of transmission opportunities for RACH preamble message transmissions for each reference signal of the set of reference signals is based on a number of transmit beams for the UE to use for each receive beam.

RACH configuration component 1360 may receive a number of RACH preamble messages according to the configured resources.

Figure 14:
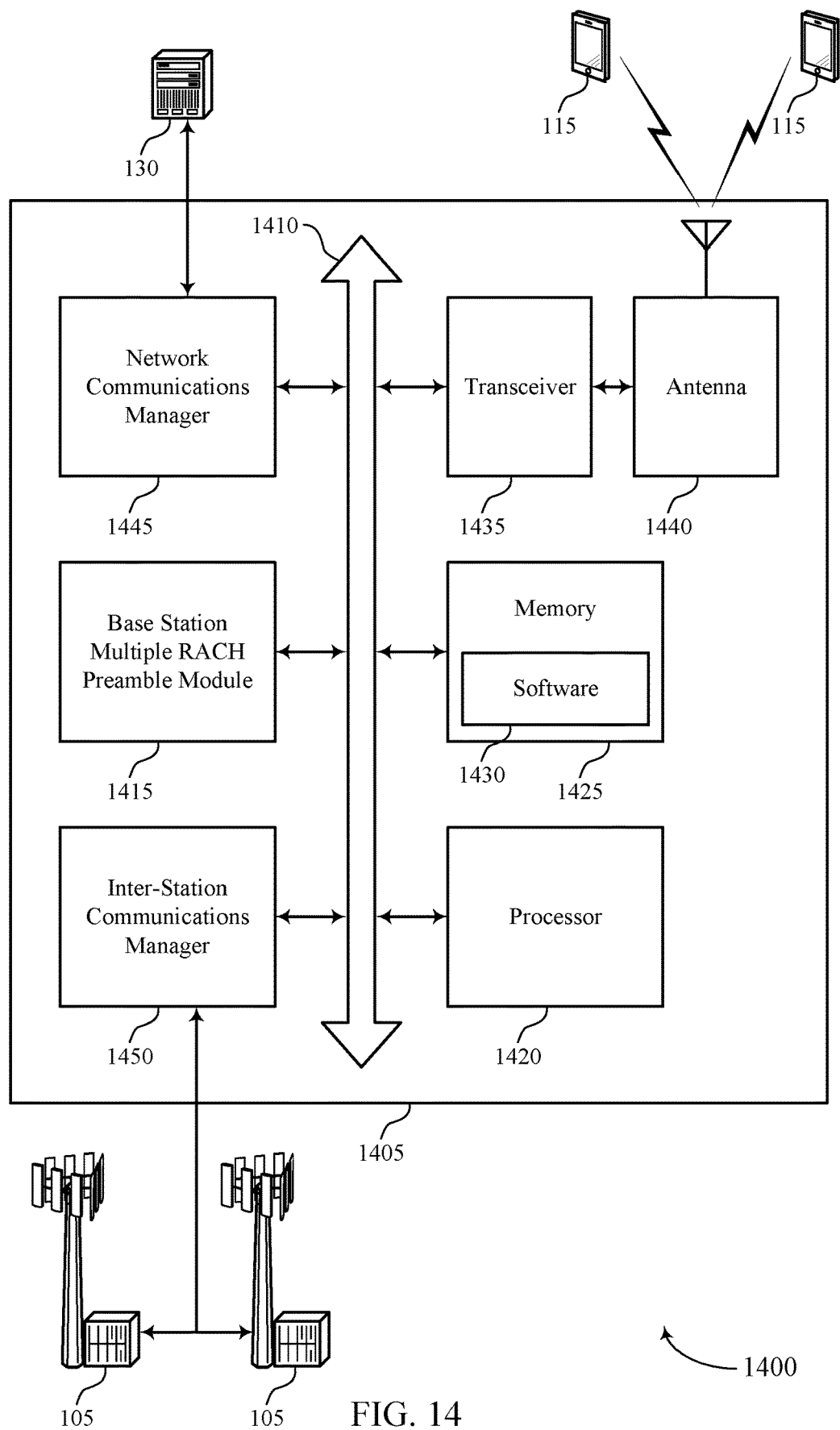
FIG. 14 illustrates a block diagram of a system including a device that supports determining a number of RACH preamble messages for transmission in accordance with aspects of the present disclosure.

FIG. 14 shows a diagram of a system 1400 including a device 1405 that supports determining a number of RACH preamble messages for transmission in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station multiple RACH preamble module 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115. Base station multiple RACH preamble module 1415 may be an example of the base station multiple RACH preamble module 1115, the base station multiple RACH preamble module 1215, or the base station multiple RACH preamble module 1315 as described with reference to FIGS. 11 through 13.

Processor 1420 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting determining a number of RACH preamble messages for transmission).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support determining a number of RACH preamble messages for transmission. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network 130 (e.g., via one or more wired backhaul links). For example, the network communications manager 1445 may manage the transfer of data communications for client devices, such as one or more UEs 115.

Inter-station communications manager 1450 may manage communications with other base station 105 and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
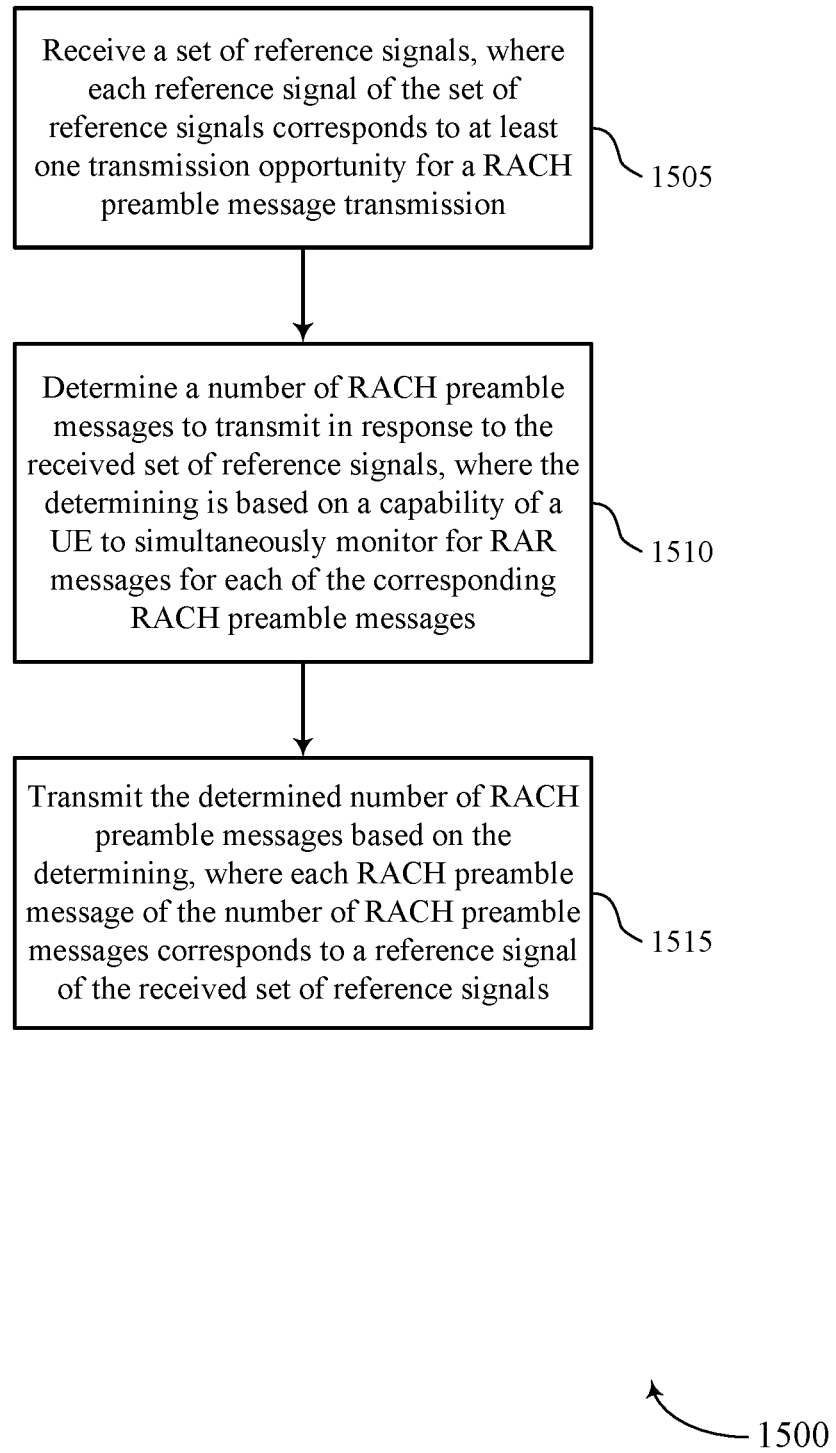
FIGS. 15 through 18 illustrate methods for determining a number of RACH preamble messages for transmission in accordance with aspects of the present disclosure.

FIG. 15 shows a flowchart illustrating a method 1500 for determining a number of RACH preamble messages for transmission in accordance with aspects of the present disclosure. The operations of method 1500 may be implemented by a UE 115 or its components as described herein. For example, the operations of method 1500 may be performed by a UE multiple RACH preamble module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive a set of reference signals, where each reference signal of the set of reference signals corresponds to at least one transmission opportunity for a RACH preamble message transmission. The operations of 1505 may be performed according to the methods described herein. In certain examples, aspects of the operations of 1505 may be performed by a reference signal component as described with reference to FIGS. 7 through 10.

At 1510 the UE 115 may determine a number of RACH preamble messages to transmit in response to the received set of reference signals, where the determining is based at least in part on a capability of the UE to simultaneously monitor for RAR messages for each of the corresponding RACH preamble messages. The operations of 1510 may be performed according to the methods described herein. In certain examples, aspects of the operations of 1510 may be performed by a RACH determination component as described with reference to FIGS. 7 through 10.

At 1515 the UE 115 may transmit the determined number of RACH preamble messages (e.g., in a RAR window) based at least in part on the determining, where each RACH preamble message of the number of RACH preamble messages corresponds to a reference signal of the received set of reference signals. The operations of 1515 may be performed according to the methods described herein. In certain examples, aspects of the operations of 1515 may be performed by a RACH transmission component as described with reference to FIGS. 7 through 10.

Figure 16:
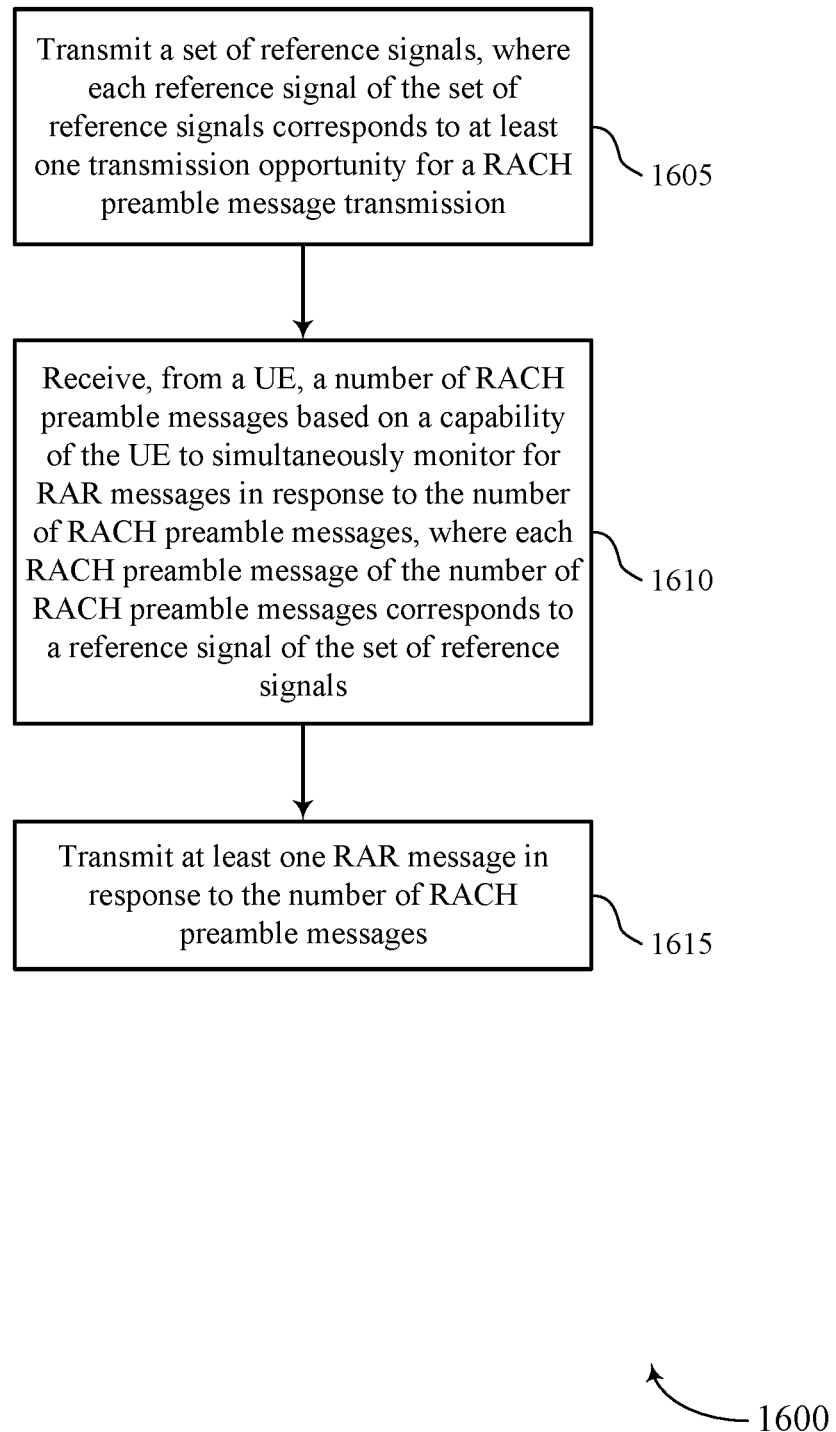

FIG. 16 shows a flowchart illustrating a method 1600 for determining a number of RACH preamble messages for transmission in accordance with aspects of the present disclosure. The operations of method 1600 may be implemented by a base station 105 or its components as described herein. For example, the operations of method 1600 may be performed by a base station multiple RACH preamble module as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may transmit a set of reference signals, where each reference signal of the set of reference signals corresponds to at least one transmission opportunity for a RACH preamble message transmission. The operations of 1605 may be performed according to the methods described herein. In certain examples, aspects of the operations of 1605 may be performed by a reference signal component as described with reference to FIGS. 11 through 14.

At 1610 the base station 105 may receive, from a UE, a number of RACH preamble messages (e.g., in a RAR window) based at least in part on a capability of the UE to simultaneously monitor for RAR messages in response to the number of RACH preamble messages, where each RACH preamble message of the number of RACH preamble messages corresponds to a reference signal of the set of reference signals. The operations of 1610 may be performed according to the methods described herein. In certain examples, aspects of the operations of 1610 may be performed by a RACH preamble component as described with reference to FIGS. 11 through 14.

At 1615 the base station 105 may transmit at least one RAR message in response to the number of RACH preamble messages. The operations of 1615 may be performed according to the methods described herein. In certain examples, aspects of the operations of 1615 may be performed by a RAR component as described with reference to FIGS. 11 through 14.

Figure 17:
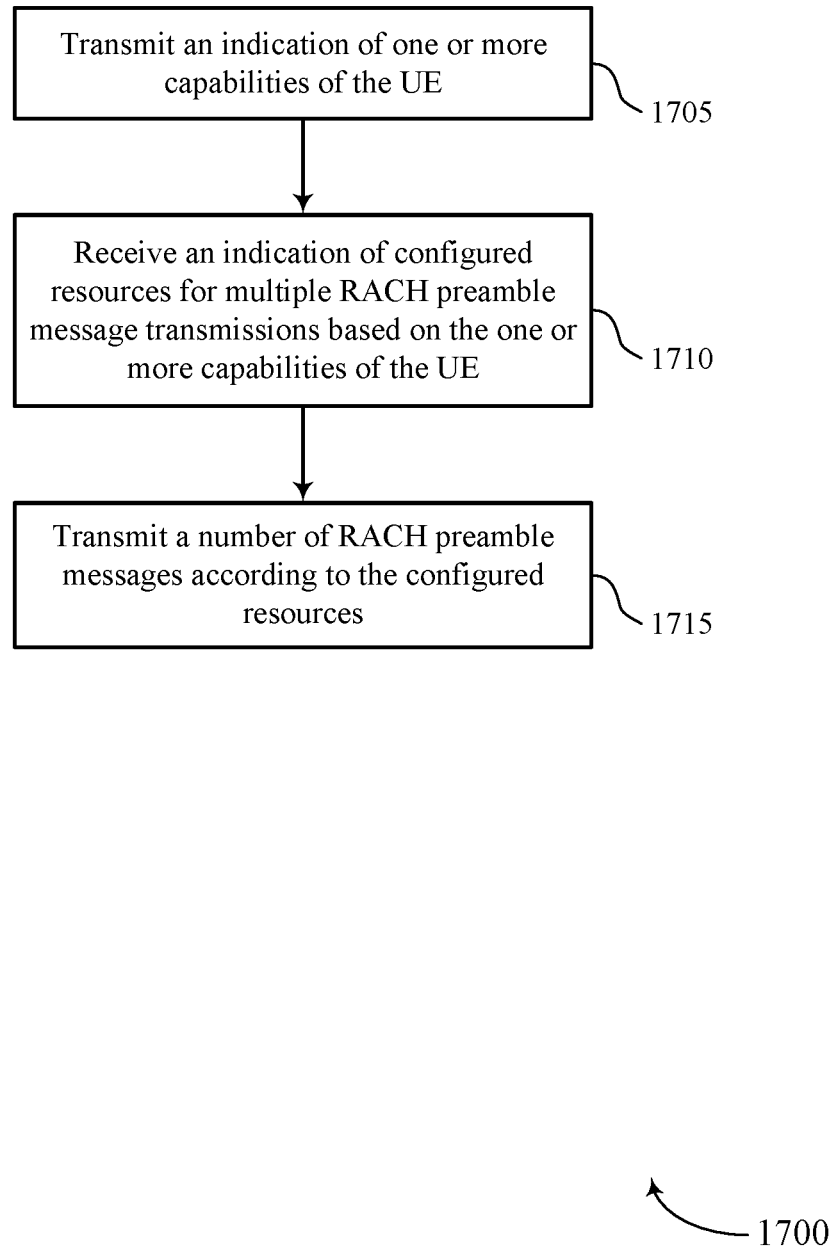

FIG. 17 shows a flowchart illustrating a method 1700 for determining a number of RACH preamble messages for transmission in accordance with aspects of the present disclosure. The operations of method 1700 may be implemented by a UE 115 or its components as described herein. For example, the operations of method 1700 may be performed by a UE multiple RACH preamble module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may transmit an indication of one or more capabilities of the UE. The operations of 1705 may be performed according to the methods described herein. In certain examples, aspects of the operations of 1705 may be performed by a UE capabilities component as described with reference to FIGS. 7 through 10.

At 1710 the UE 115 may receive an indication of configured resources for multiple RACH preamble message transmissions (e.g., within a RAR window) based at least in part on the one or more capabilities of the UE. The operations of 1710 may be performed according to the methods described herein. In certain examples, aspects of the operations of 1710 may be performed by a configuration identifier as described with reference to FIGS. 7 through 10.

At 1715 the UE 115 may transmit a number of RACH preamble messages according to the configured resources. The operations of 1715 may be performed according to the methods described herein. In certain examples, aspects of the operations of 1715 may be performed by a RACH configuration component as described with reference to FIGS. 7 through 10.

Figure 18:
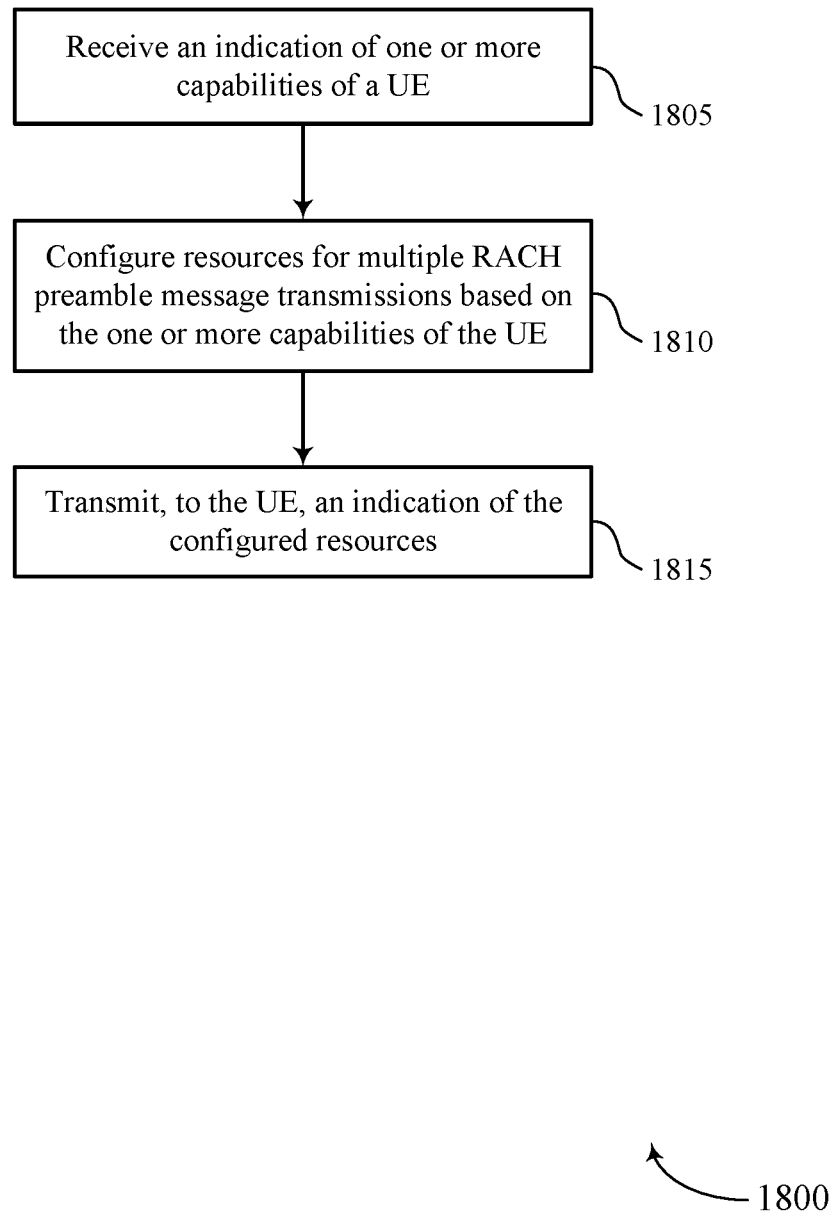

FIG. 18 shows a flowchart illustrating a method 1800 for determining a number of RACH preamble messages for transmission in accordance with aspects of the present disclosure. The operations of method 1800 may be implemented by a base station 105 or its components as described herein. For example, the operations of method 1800 may be performed by a base station multiple RACH preamble module as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may receive an indication of one or more capabilities of a UE. The operations of 1805 may be performed according to the methods described herein. In certain examples, aspects of the operations of 1805 may be performed by a UE capabilities component as described with reference to FIGS. 11 through 14.

At 1810 the base station 105 may configure resources for multiple RACH preamble message transmissions (e.g., within a RAR window) based at least in part on the one or more capabilities of the UE. The operations of 1810 may be performed according to the methods described herein. In certain examples, aspects of the operations of 1810 may be performed by a resource configuration component as described with reference to FIGS. 11 through 14.

At 1815 the base station 105 may transmit, to the UE, an indication of the configured resources. The operations of 1815 may be performed according to the methods described herein. In certain examples, aspects of the operations of 1815 may be performed by a configuration identifier as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving a plurality of reference signals, wherein each reference signal of the plurality of reference signals corresponds to at least one transmission opportunity for a random access channel (RACH) preamble message transmission;
    determining a number of RACH preamble messages to transmit in response to the received plurality of reference signals, wherein the determining is based at least in part on a capability of the UE to simultaneously monitor for random access response (RAR) messages corresponding to the number of RACH preamble messages; and
    transmitting the determined number of RACH preamble messages based at least in part on the determining, wherein each RACH preamble message of the number of RACH preamble messages corresponds to a reference signal of the received plurality of reference signals.

2. The method of claim 1, wherein transmitting the determined number of RACH preamble messages further comprises:
    transmitting the determined number of RACH preamble messages in a RAR window.

3. The method of claim 2, wherein transmitting the determined number of RACH preamble messages in the RAR window comprises:
    transmitting at least one RACH preamble message of the determined number of RACH preamble messages before expiration of the RAR window, wherein the RAR window corresponds to a previously transmitted RACH preamble message.

4. The method of claim 2, wherein transmitting the determined number of RACH preamble messages comprises:
    transmitting multiple RACH preamble messages corresponding to a same reference signal of the plurality of references signals within the RAR window based at least in part on the same reference signal corresponding to multiple transmission opportunities for RACH preamble message transmissions.

5. The method of claim 2, wherein the RAR window corresponds to a first RACH preamble message of the number of RACH preamble messages.

6. The method of claim 1, further comprising:
    monitoring for a plurality of RAR messages, wherein each RAR message of the plurality of RAR messages is in response to an associated RACH preamble message of the number of RACH preamble messages.

7. The method of claim 6, wherein each reference signal of the plurality of reference signals is received on a particular receive beam, and wherein monitoring for the plurality of RAR messages comprises:
    monitoring for each RAR message on the particular receive beam for the reference signal corresponding to the associated RACH preamble message.

8. The method of claim 6, further comprising:
    receiving one or more RAR messages in response to one or more of the number of RACH preamble messages.

9. The method of claim 8, further comprising:
    halting the monitoring based at least in part on receiving a first RAR message in response to the one or more of the number of RACH preamble messages.

10. The method of claim 8, further comprising:
    selecting one RAR message from multiple received RAR messages based at least in part on a receiving order of the multiple received RAR messages, indicated RACH message 3 (Msg3) transmission powers for the multiple received RAR messages, estimated receive powers for the multiple received RAR messages, a pseudo-random selection process, or a combination thereof; and
    transmitting a single RACH Msg3 in response to the multiple received RAR messages based at least in part on the selecting.

11. The method of claim 8, further comprising:
    transmitting multiple RACH message 3 (Msg3) transmissions in response to multiple received RAR messages.

12. The method of claim 1, wherein the capability of the UE to simultaneously monitor for RAR messages corresponding to the number of RACH preamble messages is based at least in part on a number of sub-arrays, a number of receive panels, a number of UE diversity branches, a number of reference signals received on each receive beam, or a combination thereof.

13. The method of claim 1, wherein determining the number of RACH preamble messages to transmit is further based at least in part on whether each reference signal of the plurality of reference signals is received at a reference signal receive power greater than a reference signal receive power threshold.

14. The method of claim 13, wherein each reference signal of the plurality of reference signals is simultaneously received at the reference signal receive power greater than the reference signal receive power threshold.

15. The method of claim 13, wherein each reference signal of the plurality of reference signals is received with a same beam at the reference signal receive power greater than the reference signal receive power threshold.

16. The method of claim 13, further comprising:
determining the reference signal receive power threshold based at least in part on a network configuration.

17. The method of claim 1, wherein the plurality of reference signals comprises synchronization signal blocks, channel state information reference signals (CSI-RSs), or a combination thereof.

18. The method of claim 1, wherein at least one of the number of RACH preamble messages corresponds to a contention-free RACH procedure.

19. The method of claim 18, further comprising:
receiving a single RAR message in response to multiple RACH preamble messages.

20. The method of claim 1, wherein at least one of the number of RACH preamble messages corresponds to a contention-based RACH procedure.

21. The method of claim 20, wherein determining the number of RACH preamble messages to transmit is further based at least in part on a maximum number of RACH preamble messages to transmit within a RAR window.

22. A method for wireless communication at a base station, comprising:
transmitting a plurality of reference signals, wherein each reference signal of the plurality of reference signals corresponds to at least one transmission opportunity for a random access channel (RACH) preamble message transmission;
receiving, from a user equipment (UE), a number of RACH preamble messages based at least in part on a capability of the UE to simultaneously monitor for random access response (RAR) messages in response to the number of RACH preamble messages, wherein each RACH preamble message of the number of RACH preamble messages corresponds to a reference signal of the plurality of reference signals; and
transmitting at least one RAR message in response to the number of RACH preamble messages.

23. The method of claim 22, wherein receiving, from the UE, the number of RACH preamble messages further comprises:
receiving, from the UE, the number of RACH preamble messages in a RAR window.

24. The method of claim 23, wherein receiving, from the UE, the number of RACH preamble messages in the RAR window comprises:
receiving at least one RACH preamble message of the number of RACH preamble messages before expiration of the RAR window, wherein the RAR window corresponds to a previously received RACH preamble message.

25. The method of claim 23, wherein the at least one RAR message is transmitted in the RAR window.

26. The method of claim 22, wherein transmitting the at least one RAR message comprises:
transmitting a single RAR message in response to the number of RACH preamble messages.

27. The method of claim 22, wherein transmitting the at least one RAR message comprises:
transmitting a RAR message in response to each received RACH preamble message of the number of RACH preamble messages.

28. The method of claim 22, further comprising:
receiving one or more RACH message 3 (Msg3) transmissions in response to the at least one RAR message.

29. A method for wireless communication at a user equipment (UE), comprising:
transmitting an indication of one or more capabilities of the UE;
receiving an indication of configured resources for multiple random access channel (RACH) preamble message transmissions based at least in part on the one or more capabilities of the UE; and
transmitting a number of RACH preamble messages according to the configured resources.

30. The method of claim 22, wherein receiving the indication of the configured resources further comprises:
receiving the indication of the configured resources for multiple RACH preamble message transmissions within a random access response (RAR) window.

31. The method of claim 29, wherein the one or more capabilities comprise a maximum number of reference signals that the UE can detect from one or more base stations simultaneously.

32. The method of claim 31, wherein the UE can simultaneously detect the maximum number of reference signals with reference signal receive powers greater than a reference signal receive power threshold.

33. The method of claim 31, wherein the reference signals comprise synchronization signal blocks, channel state information reference signals (CSI-RSs), or a combination thereof.

34. The method of claim 29, wherein the one or more capabilities comprise a number of sub-arrays, a number of receive panels, a number of UE diversity branches, a number of receive beams, a number of transmit beams, or a combination thereof.

35. The method of claim 29, wherein the one or more capabilities comprise a level of beam correspondence for the UE.

36. The method of claim 35, further comprising:
receiving a plurality of reference signals, wherein a number of transmission opportunities for RACH preamble message transmissions for each reference signal of the plurality of reference signals is based at least in part on a number of transmit beams for the UE to use for each receive beam.

37. The method of claim 29, wherein the indication of the configured resources comprises a handover message, radio resource control (RRC) signaling, a medium access control (MAC) control element (CE), downlink control information (DCI), a master information block (MIB), remaining system information (RMSI), other system information (OSI), or a combination thereof.

38. The method of claim 29, wherein the configured resources correspond to a contention-free RACH procedure.

39. A method for wireless communication at a base station, comprising:

receiving an indication of one or more capabilities of a user equipment (UE);

configuring resources for multiple random-access channel (RACH) preamble message transmissions based at least in part on the one or more capabilities of the UE; and transmitting, to the UE, an indication of the configured resources.

40. The method of claim 39, wherein configuring the resources for multiple RACH preamble message transmissions further comprises:

configuring the resources for multiple RACH preamble message transmissions within a random access response (RAR) window.

41. The method of claim 39, wherein the one or more capabilities comprise a maximum number of reference signals that the UE can detect from one or more base stations within a time window.

42. The method of claim 41, wherein the maximum number of reference signals is based at least in part on a reference signal receive power threshold.

43. The method of claim 41, wherein the reference signals comprise synchronization signal blocks, channel state information reference signals (CSI-RSs), or a combination thereof.

44. The method of claim 39, wherein the one or more capabilities comprise a number of sub-arrays, a number of receive panels, a number of UE diversity branches, a number of receive beams, a number of transmit beams, or a combination thereof.

45. The method of claim 39, wherein the one or more capabilities comprise a level of beam correspondence for the UE.

46. The method of claim 45, further comprising:

transmitting a plurality of reference signals, wherein a number of transmission opportunities for RACH preamble message transmissions for each reference signal of the plurality of reference signals is based at least in part on a number of transmit beams for the UE to use for each receive beam.

47. The method of claim 39, wherein the indication of the configured resources comprises a handover message, radio resource control (RRC) signaling, a medium access control (MAC) control element (CE), downlink control information (DCI), a master information block (MIB), remaining system information (RMSI), other system information (OSI), or a combination thereof.

48. The method of claim 39, further comprising:

receiving a number of RACH preamble messages according to the configured resources.

49. The method of claim 39, wherein the configured resources correspond to a contention-free RACH procedure.

50. An apparatus for wireless communication at a user equipment (UE), comprising:

a processor;

memory in electronic communication with the processor; and instructions stored in the memory and executable by the processor to cause the apparatus to:

receive a plurality of reference signals, wherein each reference signal of the plurality of reference signals corresponds to at least one transmission opportunity for a random access channel (RACH) preamble message transmission;

determine a number of RACH preamble messages to transmit in response to the received plurality of reference signals, wherein the determining is based at least in part on a capability of the UE to simultaneously monitor for random access response (RAR) messages corresponding to the number of RACH preamble messages; and transmit the determined number of RACH preamble messages based at least in part on the determining, wherein each RACH preamble message of the number of RACH preamble messages corresponds to a reference signal of the received plurality of reference signals.

51. The apparatus of claim 50, wherein the instructions to transmit the determined number of RACH preamble messages are further executable by the processor to cause the apparatus to:

transmit the determined number of RACH preamble messages in a RAR window.

52. The apparatus of claim 51, wherein the instructions to transmit the number of RACH preamble messages in the RAR window are executable by the processor to cause the apparatus to:

transmit at least one RACH preamble message of the determined number of RACH preamble messages before expiration of the RAR window, wherein the RAR window corresponds to a previously transmitted RACH preamble message.

53. The apparatus of claim 51, wherein the instructions to transmit the number of RACH preamble messages are executable by the processor to cause the apparatus to:

transmit multiple RACH preamble messages corresponding to a same reference signal of the plurality of references signals within the RAR window based at least in part on the same reference signal corresponding to multiple transmission opportunities for RACH preamble message transmissions.

54. The apparatus of claim 51, wherein the RAR window corresponds to a first RACH preamble message of the number of RACH preamble messages.

55. The apparatus of claim 50, wherein the instructions are further executable by the processor to cause the apparatus to:

monitor for a plurality of RAR messages, wherein each RAR message of the plurality of RAR messages is in response to an associated RACH preamble message of the number of RACH preamble messages.

56. The apparatus of claim 55, wherein each reference signal of the plurality of reference signals is received on a particular receive beam, and wherein the instructions to monitor for the plurality of RAR messages are executable by the processor to cause the apparatus to:

monitor for each RAR message on the particular receive beam for the reference signal corresponding to the associated RACH preamble message.

57. The apparatus of claim 55, wherein the instructions are further executable by the processor to cause the apparatus to:

receive one or more RAR messages in response to one or more of the number of RACH preamble messages.

58. The apparatus of claim 57, wherein the instructions are further executable by the processor to cause the apparatus to:

halt the monitoring based at least in part on receiving a first RAR message in response to the one or more of the number of RACH preamble messages.

59. The apparatus of claim 57, wherein the instructions are further executable by the processor to cause the apparatus to:

select one RAR message from multiple received RAR messages based at least in part on a receiving order of the multiple received RAR messages, indicated RACH message 3 (Msg3) transmission powers for the multiple received RAR messages, estimated receive powers for the multiple received RAR messages, a pseudo-random selection process, or a combination thereof; and transmit a single RACH Msg3 in response to the multiple received RAR messages based at least in part on the selecting.

60. The apparatus of claim 57, wherein the instructions are further executable by the processor to cause the apparatus to:

transmit multiple RACH message 3 (Msg3) transmissions in response to multiple received RAR messages.

61. The apparatus of claim 50, wherein the capability of the UE to simultaneously monitor for RAR messages corresponding to the number of RACH preamble messages is based at least in part on a number of sub-arrays, a number of receive panels, a number of UE diversity branches, a number of reference signals received on each receive beam, or a combination thereof.

62. The apparatus of claim 50, wherein determining the number of RACH preamble messages to transmit is further based at least in part on whether each reference signal of the plurality of reference signals is received at a reference signal receive power greater than a reference signal receive power threshold.

63. The apparatus of claim 62, wherein each reference signal of the plurality of reference signals is simultaneously received at the reference signal receive power greater than the reference signal receive power threshold.

64. The apparatus of claim 62, wherein each reference signal of the plurality of reference signals is received with a same beam at the reference signal receive power greater than the reference signal receive power threshold.

65. The apparatus of claim 62, wherein the instructions are further executable by the processor to cause the apparatus to:

determine the reference signal receive power threshold based at least in part on a network configuration.

66. The apparatus of claim 50, wherein the plurality of reference signals comprises synchronization signal blocks, channel state information reference signals (CSI-RSs), or a combination thereof.

67. The apparatus of claim 50, wherein at least one of the number of RACH preamble messages corresponds to a contention-free RACH procedure.

68. The apparatus of claim 67, wherein the instructions are further executable by the processor to cause the apparatus to:

receive a single RAR message in response to multiple RACH preamble messages.

69. The apparatus of claim 50, wherein at least one of the number of RACH preamble messages corresponds to a contention-based RACH procedure.

70. The apparatus of claim 69, wherein determining the number of RACH preamble messages to transmit is further based at least in part on a maximum number of RACH preamble messages to transmit within a RAR window.

71. An apparatus for wireless communication at a base station, comprising:

a processor;
memory in electronic communication with the processor; and
instructions stored in the memory and executable by the processor to cause the apparatus to:

transmit a plurality of reference signals, wherein each reference signal of the plurality of reference signals corresponds to at least one transmission opportunity for a random access channel (RACH) preamble message transmission;

receive, from a user equipment (UE), a number of RACH preamble messages based at least in part on a capability of the UE to simultaneously monitor for random access response (RAR) messages in response to the number of RACH preamble messages, wherein each RACH preamble message of the number of RACH preamble messages corresponds to a reference signal of the plurality of reference signals; and transmit at least one RAR message in response to the number of RACH preamble messages.

72. The apparatus of claim 71, wherein the instructions to receive, from the UE, the number of RACH preamble messages are further executable by the processor to cause the apparatus to:

receive, from the UE, the number of RACH preamble messages in a RAR window.

73. The apparatus of claim 72, wherein the instructions to receive, from the UE, the number of RACH preamble messages in the RAR window are executable by the processor to cause the apparatus to:

receive at least one RACH preamble message of the number of RACH preamble messages before expiration of the RAR window, wherein the RAR window corresponds to a previously received RACH preamble message.

74. The apparatus of claim 72, wherein the at least one RAR message is transmitted in the RAR window.

75. The apparatus of claim 71, wherein the instructions to transmit the at least one RAR message are executable by the processor to cause the apparatus to:

transmit a single RAR message in response to the number of RACH preamble messages.

76. The apparatus of claim 71, wherein the instructions to transmit the at least one RAR message are executable by the processor to cause the apparatus to:

transmit a RAR message in response to each received RACH preamble message of the number of RACH preamble messages.

77. The apparatus of claim 71, wherein the instructions are further executable by the processor to cause the apparatus to:

receive one or more RACH message 3 (Msg3) transmissions in response to the at least one RAR message.

78. An apparatus for wireless communication at a user equipment (UE), comprising:

a processor;
memory in electronic communication with the processor; and
instructions stored in the memory and executable by the processor to cause the apparatus to:

transmit an indication of one or more capabilities of the UE;

receive an indication of configured resources for multiple random access channel (RACH) preamble message transmissions based at least in part on the one or more capabilities of the UE; and transmit a number of RACH preamble messages according to the configured resources.

79. The apparatus of claim 78, wherein the instructions to receive the indication of the configured resources for multiple RACH preamble message transmissions are further executable by the processor to cause the apparatus to:
receive the indication of the configured resources for multiple RACH preamble message transmissions within a random access response (RAR) window.

80. The apparatus of claim 78, wherein the one or more capabilities comprise a maximum number of reference signals that the UE can detect from one or more base stations simultaneously.

81. The apparatus of claim 80, wherein the UE can simultaneously detect the maximum number of reference signals with reference signal receive powers greater than a reference signal receive power threshold.

82. The apparatus of claim 80, wherein the reference signals comprise synchronization signal blocks, channel state information reference signals (CSI-RSs), or a combination thereof.

83. The apparatus of claim 78, wherein the one or more capabilities comprise a number of sub-arrays, a number of receive panels, a number of UE diversity branches, a number of receive beams, a number of transmit beams, or a combination thereof.

84. The apparatus of claim 78, wherein the one or more capabilities comprise a level of beam correspondence for the UE.

85. The apparatus of claim 84, wherein the instructions are further executable by the processor to cause the apparatus to:
receive a plurality of reference signals, wherein a number of transmission opportunities for RACH preamble message transmissions for each reference signal of the plurality of reference signals is based at least in part on a number of transmit beams for the UE to use for each receive beam.

86. The apparatus of claim 78, wherein the indication of the configured resources comprises a handover message, radio resource control (RRC) signaling, a medium access control (MAC) control element (CE), downlink control information (DCI), a master information block (MIB), remaining system information (RMSI), other system information (OSI), or a combination thereof.

87. The apparatus of claim 78, wherein the configured resources correspond to a contention-free RACH procedure.

88. An apparatus for wireless communication at a base station, comprising:
a processor;
memory in electronic communication with the processor; and
instructions stored in the memory and executable by the processor to cause the apparatus to:
receive an indication of one or more capabilities of a user equipment (UE);
configure resources for multiple random access channel (RACH) preamble message transmissions based at least in part on the one or more capabilities of the UE; and
transmit, to the UE, an indication of the configured resources.

89. The apparatus of claim 88, wherein the instructions to configure the resources for multiple RACH preamble message transmissions are further executable by the processor to cause the apparatus to:
configure the resources for multiple RACH preamble message transmissions within a random access response (RAR) window.

90. The apparatus of claim 88, wherein the one or more capabilities comprise a maximum number of reference signals that the UE can detect from one or more base stations within a time window.

91. The apparatus of claim 90, wherein the maximum number of reference signals is based at least in part on a reference signal receive power threshold.

92. The apparatus of claim 90, wherein the reference signals comprise synchronization signal blocks, channel state information reference signals (CSI-RSs), or a combination thereof.

93. The apparatus of claim 88, wherein the one or more capabilities comprise a number of sub-arrays, a number of receive panels, a number of UE diversity branches, a number of receive beams, a number of transmit beams, or a combination thereof.

94. The apparatus of claim 88, wherein the one or more capabilities comprise a level of beam correspondence for the UE.

95. The apparatus of claim 94, wherein the instructions are further executable by the processor to cause the apparatus to:
transmit a plurality of reference signals, wherein a number of transmission opportunities for RACH preamble message transmissions for each reference signal of the plurality of reference signals is based at least in part on a number of transmit beams for the UE to use for each receive beam.

96. The apparatus of claim 88, wherein the indication of the configured resources comprises a handover message, radio resource control (RRC) signaling, a medium access control (MAC) control element (CE), downlink control information (DCI), a master information block (MIB), remaining system information (RMSI), other system information (OSI), or a combination thereof.

97. The apparatus of claim 88, wherein the instructions are further executable by the processor to cause the apparatus to:
receive a number of RACH preamble messages according to the configured resources.

98. The apparatus of claim 88, wherein the configured resources correspond to a contention-free RACH procedure.

* * * * *